March 10, 1959 C. M. KENRICH ET AL 2,877,447

BINARY EXCESS-3 CONVERTER

Filed July 27, 1956

4 Sheets-Sheet 1

INVENTORS.
CHESTER M. KENRICH
BEVERLY L. CREW

BY Roland A. Anderson

ATTORNEY.

March 10, 1959

C. M. KENRICH ET AL 2,877,447

BINARY EXCESS-3 CONVERTER

Filed July 27, 1956

4 Sheets-Sheet 2

INVENTORS.
CHESTER M. KENRICH
BEVERLY L. CREW

BY Roland A. Anderson

ATTORNEY.

March 10, 1959

C. M. KENRICH ET AL 2,877,447

BINARY EXCESS-3 CONVERTER

Filed July 27, 1956

4 Sheets-Sheet 3

INVENTORS.
CHESTER M. KENRICH
BEVERLY L. CREW

BY Roland A. Anderson

ATTORNEY.

INVENTORS.
CHESTER M. KENRICH
BEVERLY L. CREW
BY
Roland A. Anderson
ATTORNEY.

United States Patent Office 2,877,447
Patented Mar. 10, 1959

2,877,447

BINARY EXCESS-3 CONVERTER

Chester M. Kenrich, Livermore, Calif., and Beverly L. Crew, Philadelphia, Pa., assignors to the United States of America as represented by the United States Atomic Energy Commission Application July 27, 1956, Serial No. 600,642

22 Claims. (Cl. 340—173)

The present invention relates generally to the conversion of excess-3 binary coded serial decimal numbers to straight binary coded serial decimal numbers, and more particularly to an electronic circuit for accomplishing such conversion.

Many codes for representing decimal digits by means of binary signals in data processing systems and the like, e. g., high speed electronic computers and their associated input and output apparatus, are well known. One of the many possible nonweighted 4-bit codes which is employed in many electronic digital computers because of several inherent advantageous properties is the excess-3 code. Such code may be generated by adding a binary 3 to each digit representation in the conventional 8, 4, 2, 1 straight binary code. For example, the decimal number 953 as is expressed serially in order of decreasing significance in the straight binary code by 1001, 0101, 0011 would be expressed in the excess-3 code by 1100, 1000, 0110, such excess-3 coded digit representations being equal to the straight binary coded digit representations 9+3, 5+3, 3+3, respectively.

It will often be found advantageous to utilize a device depending upon one code system in conjunction with a device depending upon a different code system for their operations. A digital computer of the type having an excess-3 coded digit output, for instance, might be advantageously employed with a suitable plotter to provide means for directly obtaining graphical solutions to problems solved by the computer. In practice, however, known plotters require straight binary coded inputs for their operation, thus to accomplish the foregoing purpose additional means must be provided to convert the excess-3 coded output of the computer to a straight binary coded input suitable for application to such known plotters.

The present invention provides such a device for converting excess-3 coded digit information, particularly the excess-3 coded pulse word output and various programming and synchronizing pulses from the high speed computer disclosed in "Schematic and Maintenance Manual for Univac, Central Computer Group," Eckert-Mauchly Division, Remington Rand, Incorporated, and "Maintenance Manual for Uniprinter, an Auxiliary Unit of the Univac System," Eckert-Mauchly Computer Corporation, to corresponding straight binary coded digit information, particularly a straight binary coded pulse word input in addition to various instruction pulses suitable for actuation of the plotter disclosed in "Instruction Book for Digi-Verter Group Type 17–31A," and "Vari Plotter Plotting Boards 205G and 205H Types I and II," both prepared by Electronic Associates, Incorporated.

The converter of the present invention in its basic form generally comprises an input circuit adapted to receive excess-3 coded pulse words of a type having an $x$ algebraic sign digit followed serially by a plurality of decimal digits in order of decreasing significance preceding a $y$ algebraic sign digit followed serially by a plurality of decimal digits in order of decreasing significance. A switching matrix is coupled to said input circuit and is internally connected to produce serial straight binary coded pulse groups indicative of the excess-3 coded input. A stepping circuit is coupled to the switching matrix and to a synchronous counter having a plurality of $x$ decimal digit and a plurality of $y$ decimal digit indicator terminals. The stepping circuit steps the counter in synchronism with the serial binary pulse group output from the switching matrix to successively produce pulses at corresponding ones of the $x$ and $y$ decimal digit indicator terminals. The combinations of straight binary coded pulse groups and corresponding decimal digit indicator signals so produced comprise a basic output suitable for application to a variety of output apparatus. Several additional circuits may be incorporated in various embodiments of the converter of the present invention for adapting same to use with specific input and output apparatus.

The device of the present invention may thus be specifically employed with the above-referenced plotter and computer for the purpose of directly deriving graphical answers at the former from various complex problems solved by the latter.

The converter of the present invention is also variously useful for converting excess-3 coded serial decimal digit pulse information from any suitable source thereof, e. g., various pulse data processing systems and the like, to straight binary coded serial decimal digit pulse information for many diversified applications.

Accordingly, it is an object of the present invention to provide an electronic circuit for converting excess-3 coded serial decimal digit pulse information to straight binary coded serial decimal digit pulse information.

A specific object of the present invention is to provide means for converting the output of the hereinbefore referenced computing device to a form suitable for correspondingly actuating the hereinbefore referenced plotting device.

It is another object of the present invention to provide conversion means capable of sensing the sign of an excess-3 coded serial decimal number.

Still another object of the present invention is to provide an excess-3 to binary converter capable of interrupting the intake of input information at the end of each number included in the output information.

It is a further object of the present invention to provide an excess-3 converter having means for clearing the storage units of associated output equipment only when a digit of a new number appears at the inputs thereto.

The invention, both as to its organization and method of operation, together with further objects and advantages thereof, will best be understood by reference to the following specification taken in conjunction with the accompanying drawing, of which:

Figure 1:
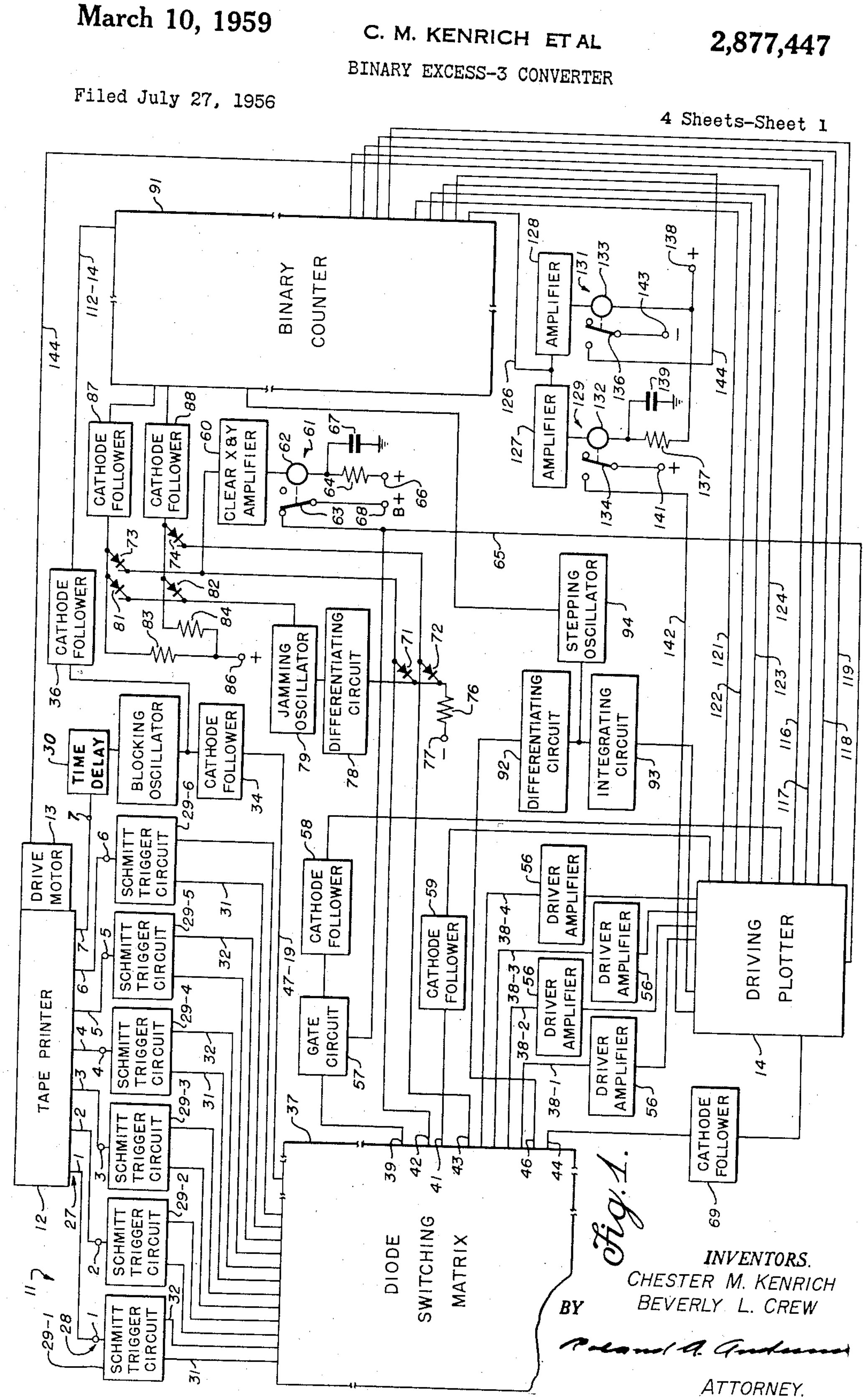
Figure 1 is a block diagram of the present invention.

In the following description, the invention is described as embodied in a conversion circuit for adapting the excess-3 coded output information from the computer disclosed in "Schematic and Maintenance Manual for Univac, Central Computer Group," and "Maintenance Manual for Uniprinter, an Auxiliary Unit of the Univac System," to straight binary information suitable for direct application to the platter disclosed in "Instruction Book for Digi-Verter Group Type 17–31A," and "Vari Plotter Plotting Boards 205G and 205H Types I and II." Briefly, in accordance with the present invention, the tape printer of the above-referenced computer reads tape serially beginning with a symbol indicating an $x$ or $y$ variable and the algebraic sign thereof followed by decimal digits in order of decreasing significance, viz., thousands, hundreds, tens, units decimal digits, for each word recorded. Each word as appears on a tape read serially by the printer is in a form as follows:

bodiment of the present invention herein described. Similarly the slash (/), 11 0100, is utilized by the present invention as an instruction character to initiate various functional operations in related apparatus.

The hereinbefore referenced plotter on the other hand normally operates from punched cards containing two straight binary coded four-decimal digit numbers. The cards are read by row in inverse numerical order, i. e., 9 row first, then 8, 7, 6 . . . 1, 0 and sign last. A special counter is used in the plotter to count from 9 . . . 0 as each row of the card is read. Such counter is called the basic timing unit. The basic timing unit primes a binary input to both an $x$ and a $y$ storage unit. Each storage unit comprises 17 thyratrons, 16 of which are utilized for decimal storage and one of which is used as a minus sign storage. Each decimal storage thyratron is energized by a different one of the four $x$ or $y$ decimal digit columns appearing on the punched card and also by a different one of the four-bit binary inputs from the basic timing unit.

At the beginning of a card reading cycle, the basic timing unit is jammed to a binary 9. If a hole is punched in the nines row of one of the $x$ or y decimal digit columns, the two thyratrons for the particular binary nine combination (i. e., eight and one) are fired. The card is then moved to the eight row and the basic timing unit is stepped to a binary eight to initiate storage at appropriate ones of the thyratrons as hereinbefore described. Similarly, each row of the card is sampled in the foregoing manner. Each time a thyratron is fired a relay in the plate circuit thereof is actuated to appropriately vary resistance in a servo null circuit driving the plotter printing head. After all of the card has been read, such servo circuit will match the total resistance change effected by the storage thyratrons. A control unit including a stepping switch synchronously programs the various steps in the operating cycle of the plotter such that after a time increment sufficient to permit loading of the storage units a second time increment is effected to null out the servo circuit and accordingly position the printing head after which a third time increment is initiated to plot the point and clear all storage information from the storage units.

The conversion circuit of the present invention is coupled to the seven channel excess-3 coded output of the referenced computer to produce a tape printer of the referenced computer to produce a synchronous output including a 4-bit straight binary output coupled directly to the $x$ and $y$ storage thyratrons of the referenced plotter and simulating the binary input normally applied thereto by the basic timing unit. An $x$ and $y$ decimal digit indicator signal output comprising indicators for the thousands, hundreds, tens, units digits of $x$ and of $y$ is produced simultaneously with the straight binary output and is coupled directly to the $x$ and $y$ storage thyratrons of the plotter to simulate the four $x$ and four $y$ decimal digit columns of a punched card. The $-x$ and $-y$ indicator outputs are respectively coupled to the minus sign storage thyratrons of the $x$ and $y$ storage units while a stepping pulse output is coupled to the plotter control unit stepping switch and to the motor driving tape through the computer tape printer for purposes of stepping the plotter to the plot position subsequent to $$\left(\begin{matrix}\text{sign}\\ x \text{ or } y\end{matrix}\right) 1000\ 100\ 10\ 1 \left(\begin{matrix}\text{extra}\\ \text{digit}\\ \text{position}\end{matrix}\right)\left(\begin{matrix}\text{sign}\\ x \text{ or } y\end{matrix}\right) 1000\ 100\ 10\ 1 \left(\begin{matrix}\text{extra}\\ \text{digit}\\ \text{position}\end{matrix}\right)$$

The tape printer generates a chain of coded pulse groups corresponding to the digits of a word being read from a seven channel output comprising two alphabetic character zone channels, four excess-3 coded decimal digit channels, and a clock channel. In the code employed in the referenced computer the two zone bits and four excess-3 bits are utilized to represent a variety of alphabetic, numerical, and symbolic characters and the like. Numerals are prefixed by zone bits of 00, utilizing conventional binary notation. The conventional characters ; (semicolon), , (comma), + (plus), and − (minus), respectively represented in the hereinbefore-mentioned code by 01 0011, 01 0001, 11 0011, and 00 0010, depict the variable and algebraic sign symbols: $x$, $-x$, $y$ and $-y$ respectively for the purposes of the emloading of a pulse word while interrupting the output of additional information from the printer during plotting. Several additional functional instruction signal outputs are also included in the output of the conversion circuit of the present invention, namely, a clear $x$ storage unit signal and a symbol advance signal. The former signal is applied to the plotter $x$-storage unit to clear same just prior to loading of a new pulse word while the latter is connected to a symbol advancing circuit in the plotter.

Figure 4:
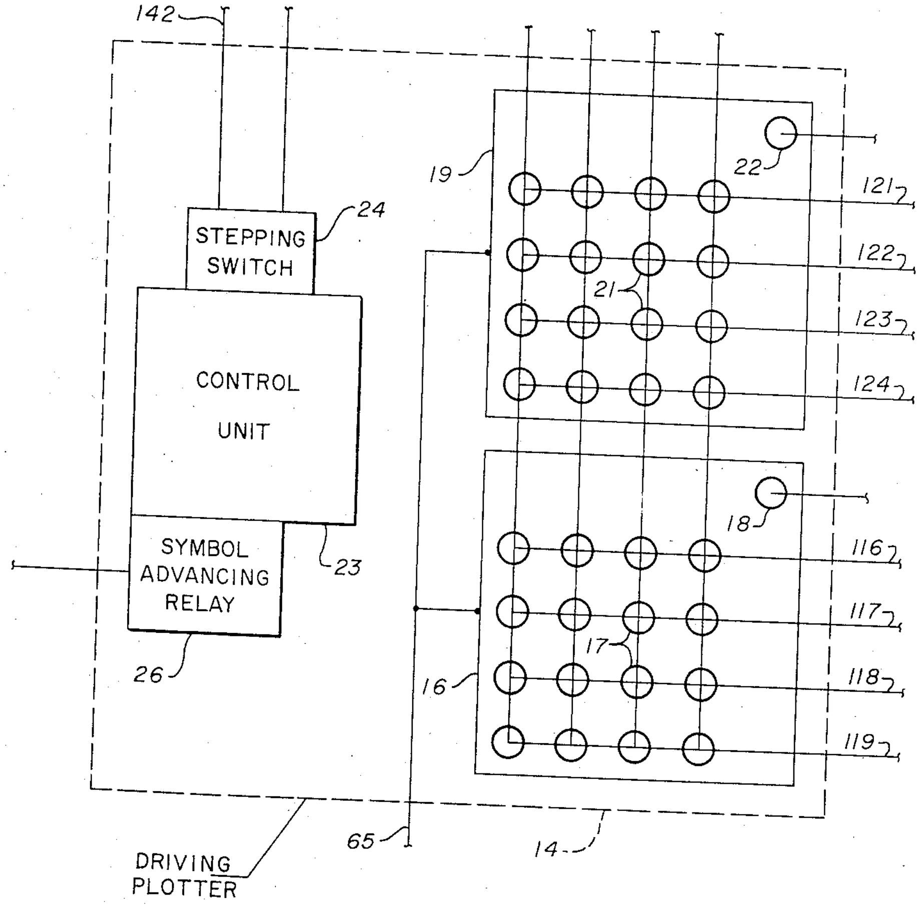
Figure 4 is a schematic block and wiring diagram of a driving plotter of Fig. 1.

Referring now to the drawing, Fig. 1 in particular, there is shown a conversion circuit 11 of the present invention driven by a tape printer 12 of the type referenced above and including a tape drive motor 13, and a driving plotter 14, similarly referenced above, such plotter (see Fig. 4) including an $x$-storage unit 16 comprising sixteen $x$-bit storage thyratrons 17 and a minus sign storage thyratron 18, a $y$-storage unit 19 comprising sixteen $y$-bit storage thyratrons 21 and a minus sign storage thyratron 22, a control unit 23 including a stepping switch 24 for programming various operations of the plotter, and a symbol advancing circuit 26 for advancing a symbol imprinter at the plotter printing head (not shown).

The sixteen $x$-bit thyratrons 17 are connected at their control grids in rows and columns of four tubes each. The four columns so formed respectively correspond to bits of 8, 4, 2, 1 while the four rows correspond to decimal digits of 1000, 100, 10, 1. The control grids of thyratrons 17 are biased such that two coincident signals (i. e., a row signal and a column signal) are required to fire a thyratron.

The sixteen $y$-bit thyratrons 21 are similarly connected in four rows and four columns as described above. The columns of $y$-bit thyratrons are correspondingly connected to the columns of $x$-bit thyratrons 17.

Printer 12 provides a seven channel output 27, of the type hereinbefore described, of which the individual channels 27–1, 27–2 are zone channels, 27–3, 27–4, 27–5, 27–6 are respectively 8,4,2,1 bit channels for providing excess-3 coded decimal digit pulse groups, and 27–7 is a clock channel. Such printer output channels 27 are connected to correspondingly indicated input terminals 28 of the converter 11.

The zone and excess-3 input terminals 28–1 through 28–6 are correspondingly connected to the inputs of a plurality of conventional Schmitt trigger circuits 29. Each trigger circuit is provided with separate normally primed and unprimed output terminals 31, 32 respectively (i. e., primed terminal 31 and unprimed terminal 32 are normally at high positive and zero potentials, respectively). A pulse appearing at the input of a trigger circuit 29 will cause same to switch to its opposite state (i. e., normally primed and unprimed terminals 31, 32 respectively revert to zero and high positive potentials) for the duration of such input pulse.

Clock input terminal 28–7 is connected to the input of a conventional blocking oscillator 33 having a delayed input by virtue of time delay 30 to compensate for inherent skewness in pulse groups appearing on the tapes as read by tape printer 12. Such oscillator shapes the clock pulses appearing at clock channel 27–7 to form corresponding positive square waves having substantially precise constant time durations. The output of blocking oscillator 33 is commonly connected to the inputs of two similar cathode followers 34, 36, the output connections of which will be described hereinafter.

Each pair of output terminals 31, 32 of trigger circuits 29 and the output of cathode follower 34 are connected to a diode switching matrix 37 for excess-3 to binary conversion. Each excess-3 coded digit comprising the combined outputs of trigger circuits 29 applied to matrix 37 is therein decoded to produce a corresponding combination of straight binary coded pulses at binary 8, 4, 2, 1 output lines 38–1, 38–2, 38–3, and 38–4, respectively. Similarly, the encoded characters semi-colon, comma, plus, minus, and slash, utilized in the present invention to respectively represent $x$, $-x$, $y$, $-y$, and symbol advance, as was hereinbefore described, effect signals at appropriate ones of $-x$, $-y$, $\pm x$, $\pm y$, and symbol advance matrix output lines 39, 41, 42, 43, and 44, respectively. In addition, each encoded numeral (i. e., irrespective of alphabetic character and symbol pulse combinations) decoded by matrix 37 functions to produce a pulse at a stepping output line 46.

Figure 2:
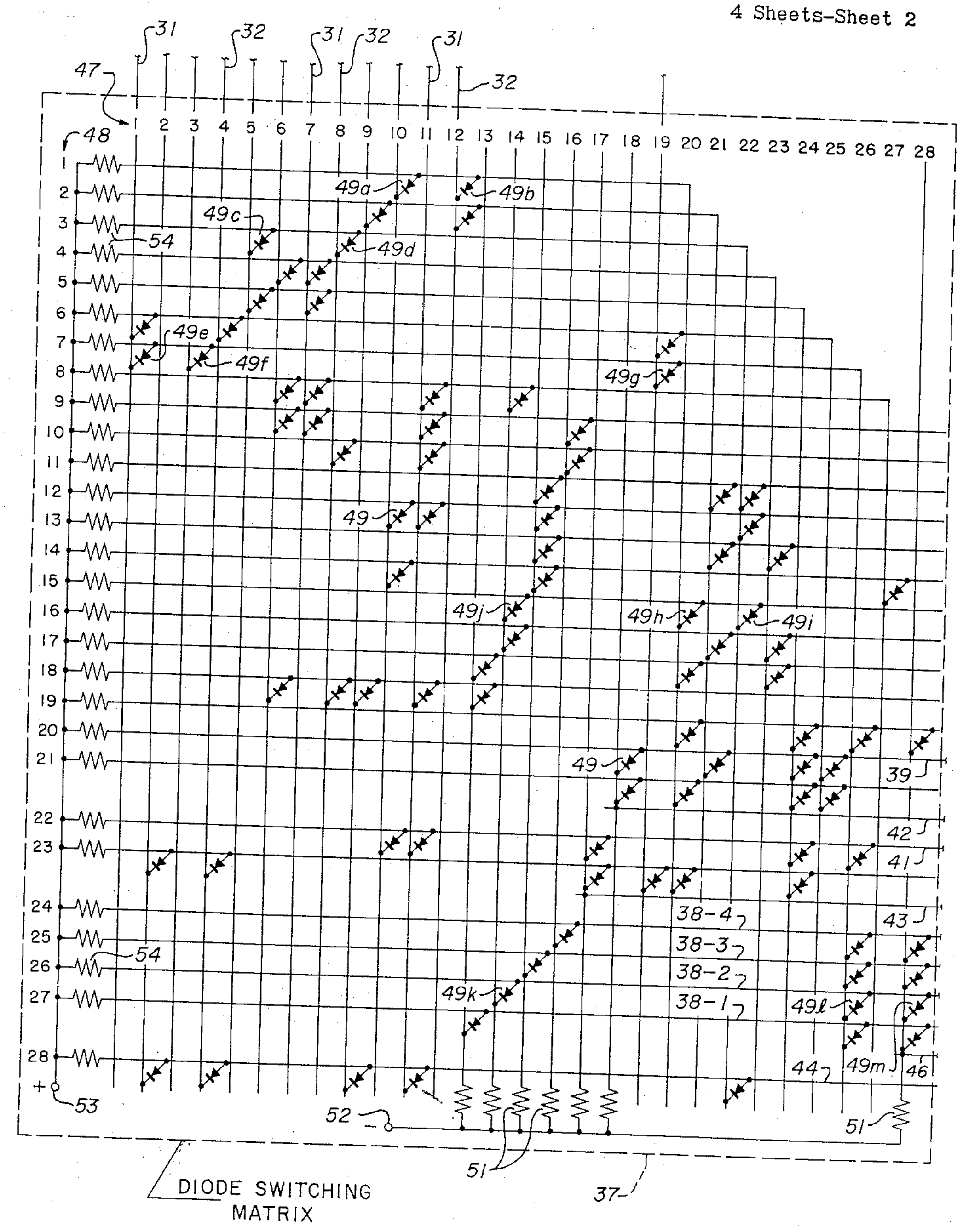
Figure 2 is a wiring diagram of a diode switching matrix of Fig. 1.

To facilitate the foregoing conversions, matrix 37 (see Fig. 2) is formed of a plurality of channels which, for convenience, are entitled vertical channels 47 and horizontal channels 48, each individual channel of which is further identified by a numerical suffix from 1 to 28 indicating successive channels in order from left to right and top to bottom respectively.

The primed and unprimed output terminals 31, 32, respectively, of Schmitt trigger circuits 29–1 to 29–6, inclusive, are respectively externally connected to vertical channels 47–1 to 47–12, inclusive, while the output of cathode follower 34 is connected to vertical channel 47–19. Similarly, binary output lines 38–1, 38–2, 38–3, 38–4 are respectively externally connected to horizontal channels 48–27, 48–26, 48–25, 48–24 while the $-x$, $-y$, $\pm x$, $\pm y$, symbol advance, and stepping output lines 39, 41, 42, 43, 44, and 46 are respectively externally connected to horizontal channel 48–20, horizontal channel 48–22, vertical channel 47–18, vertical channel 47–17, horizontal channel 48–28, and vertical channel 47–28.

Vertical and horizontal channels 47, 48 respectively are interconnected in a complex manner by a plurality of switching diodes 49. The cathodes of all diodes in a particular vertical channel are commonly connected. Further, several vertical channels, viz., 47–13, 47–14, 47–15, 47–16, 47–17, 47–18, and 47–28, are each series connected through a corresponding bias resistor 51 to a high negative potential indicated generally at 52, the diodes 49 in each one of such biased vertical channels thereby comprising "Or" gates. A pulse applied to any one of the diodes of such "Or" gates effects a pulse of essentially the same magnitude on the corresponding vertical channel.

The anodes of all diodes in each horizontal channel 48 are commonly connected to a high positive potential shown generally at 53 through a corresponding one of a plurality of bias resistors 54. Each horizontal channel including the diodes 49 connected thereto comprises an "And" gate, i. e., coincident pulses applied to all diodes of one of such "And" gates are required to effect a pulse of essentially the same magnitude at the corresponding horizontal channel.

It is to be noted that horizontal channels 48–1 to 48–8, inclusive, are respectively physically connected to vertical channels 47–20 to 47–27, inclusive.

The various connections of diodes 49 to various ones of the vertical and horizontal channels 47, 48, respectively, to comprise a complex arrangement of "And" and "Or" gates for the purposes of the present invention may be best illustrated by Table 1 which follows. In the table, each block depicts traversal of each possible different set of vertical and horizontal channels 47, 48. An $x$ in a block indicates a diode 49 having its cathode connected to the corresponding vertical channel 47 and its anode connected to the corresponding horizontal channel 48. In addition, the physical connections of vertical and horizontal channels 47, 48, respectively, mentioned above are depicted by the symbol, 0, in the table.

*Table 1*

| Horizontal Channels 48 | Vertical Channels 47 | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 1 | | | | | | | | | | x | | x | | | | | | | | 0 | | | | | | | | |
| 2 | | | | | | | | | x | | | x | | | | | | | | | 0 | | | | | | | |
| 3 | | | | | x | | | x | | | | | | | | | | | | | | 0 | | | | | | |
| 4 | | | | | | x | x | | | | | | | | | | | | | | | | 0 | | | | | |
| 5 | | | | | x | | x | | | | | | | | | | | | | | | | | 0 | | | | |
| 6 | x | | | x | | | | | | | | | | | | | | | x | | | | | | 0 | | | |
| 7 | x | | x | | | | | | | | | | | | | | | | x | | | | | | | 0 | | |
| 8 | | | | | | x | x | | | | x | | | x | | | | | | | | | | | | | 0 | |
| 9 | | | | | | x | x | | | | x | | | | | x | | | | | | | | | | | | |
| 10 | | | | | | | | x | | | x | | | | | x | | | | | | | | | | | | |
| 11 | | | | | | | | | | | | | | | x | | | | | | x | x | | | | | | |
| 12 | | | | | | | | | | x | x | | | | x | | | | | | | x | | | | | | |
| 13 | | | | | | | | | | | | | | | x | | | | | | x | | x | | | | | |
| 14 | | | | | | | | | | x | | | | | x | | | | | | | | | | | | x | |
| 15 | | | | | | | | | | | | | | x | | | | | | x | | x | | | | | | |
| 16 | | | | | | | | | | | | | | x | | | | | | | x | | x | | | | | |
| 17 | | | | | | | | | | | | | x | | | | | | | x | | | x | | | | | |
| 18 | | | | | | x | | x | x | | x | | x | | | | | | | | | | | | | | | |
| 19 | | | | | | | | | | | | | | | | | | | | x | | | | x | | x | | x |
| 20 | | | | | | | | | | | | | | | | | | x | | | x | | | x | x | | | |
| 21 | | | | | | | | | | | | | | | | | | x | | x | | | | x | x | | | |
| 22 | | | | | | | | | | x | x | | | | | | x | | | | | | | x | | x | | |
| 23 | | x | | x | | | | | | | | | | | | | x | | x | x | | | | x | | | | |
| 24 | | | | | | | | | | | | | | | | x | | | | | | | | | | x | | x |
| 25 | | | | | | | | | | | | | | | x | | | | | | | | | | | x | | x |
| 26 | | | | | | | | | | | | | | x | | | | | | | | | | | | x | | x |
| 27 | | | | | | | | | | | | | x | | | | | | | | | | | | | x | | x |
| 28 | | x | | x | | | | | x | | x | | | | | | | | | | | x | | | | | | |

The manner in which the switching matrix 37 effects conversion from the pulse input, as applied thereto by Schmitt trigger circuits 29, to appropriate output pulses at lines 38, 39, 41, 42, 43, 44, 46, may best be described by several examples. It is to be noted that if the input information is "legal" (i. e., a numeral or any one of the hereinbefore mentioned symbols utilized as functional instruction signals or algebraic sign signals), only one path may be traced through matrix 37 to an output line. If the combination is "illegal" (i. e., an alphabetic or character symbol other than those utilized in the present invention) no path may be traced through matrix 37 to an output line. To demonstrate the foregoing, consider an excess-3 coded four applied to input terminals 28 from the tape printer output channels 27. An excess-3 coded four is designated in binary notation as 000111, i. e., Schmitt trigger circuits 29–1, 29–2, 29–3, and 29–4, 29–5, 29–6 are respectively unprimed and primed. Consequently, positive pulses appear at the normally primed terminals 31 of the unprimed trigger circuits and at the normally unprimed terminals 32 of the primed trigger circuits, the remaining normally unprimed and primed terminals being at ground potential. Thus vertical channels 47–1, 47–3, 47–5, 47–8, 47–10, 47–12 of matrix 37 are pulsed positive while channels 47–2, 47–4, 47–6, 47–7, 47–9, 47–11 are at ground potential. In addition, a pulse is applied to blocking oscillator 33 from the clock channel input terminal 28–7, since clock pulses occur during the digit time of each pulse group effected at the output channels 27 of tape printer 12. A pulse is therefore applied by cathode follower 34 to vertical channel 47–19. The positive pulses and ground potentials applied to vertical channels 47–1 through 47–12, and 47–19 are thus correspondingly applied to all diodes 49 connected thereto. Since diodes 49*a*, 49*b*, respectively, connected to coincidently positively pulsed channels 47–10, 47–12 comprise an "And" gate at horizontal channel 48–1, a positive pulse is effected thereon.

Similarly, coincident positive pulses at vertical channels 47–5, 47–8 effect a positive pulse at horizontal channel 48–3 through diodes 49*c*, 49*d* while a positive pulse is effected at horizontal channel 48–7 because of coincident positive pulses applied to "And" gate diodes 49*e*, 49*f*, 49*g* via vertical channels 47–1, 47–3, 47–19, respectively.

Positive pulses are also effected at vertical channels 47–20, 47–22, 47–26 directly connected to horizontal channels 48–1, 48–3, 48–7, respectively. Consequently since diodes 49*h*, 49*i*, respectively connected to positively pulsed channels 47–20, 47–22 comprise an "And" gate at horizontal channel 48–15, said horizontal channel is also pulsed positive, thereby pulsing diode 49*j* of the "Or" gate at vertical channel 47–14. A pulse applied to any one of the diodes of an "Or" gate channel effects a pulse of substantially equal magnitude thereon. Thus, vertical channel 47–14 is pulsed positive, thereby pulsing the cathodes of all diodes 49 connected thereto.

Diodes 49k, 49l comprising an "And" gate at horizontal channel 48–26 and respectively connected to coincidently pulsed vertical channels 47–14, 47–26, effect a positive pulse at such horizontal channel 48–26 and therefore at binary 4 output line 38–2 connected thereto. Diode 49m connected to horizontal channel 48–26 and to vertical "Or" gate channel 47–28 is thus also pulsed positive to effect a simultaneous pulse at stepping output line 46.

Considering now a case where the input information applied to matrix 37 is "illegal," it is to be noted that in the code of the device including tape printer 12 the letters D, M, or U are identical to the excess-3 coded decimal 4 hereinbefore described except that one or both zone channels 27–1, 27–2 are energized. The primed output terminals 32 of one or both of the Schmitt trigger circuits 29–1, 29–2, are energized. Hence, the diodes 49e, 49f respectively connected between the matrix vertical channels 47–1, 47–3 and horizontal channel 48–7 will not conduct coincidently for any of the foregoing "illegal" letter combinations and hence a pulse is not effected at horizontal chanel 48–7 and directly connected vertical channel 47–26. A half-premissive pulse is consequently not effected at horizontal channel 48–26 by diode 491 connected between vertical channel 47–26 and such horizontal chanel 48–26. Consequently, output pulses are not applied to the binary 4 output line 38–2 or to stepping output line 46 when the encoded letters D, M, or U are applied to the matrix input. It may be similarly shown that all other "illegal" input combinations are excluded from the output of matrix 37.

Continuing now with the physical description of the present invention, the binary output lines 38 of matrix 37 are correspondingly connected to the inputs of driver amplifiers 56 (see Fig. 1). Such amplifiers 56 may be of any suitable type for producing a square output pulse upon energization by an input pulse, preferably triode driver stages, plate-coupled to the high voltage winding of an audio output transformer. The outputs of driver amplifiers 56 (e. g., the low voltage winding of each one of the above-mentioned audio transformers) are correspondingly connected to the grids of the 8, 4, 2, 1 bit columns of $x$ and $y$ digit storage thyratrons 17, 21 comprising the $x$ and $y$ storage units 16, 19 of vari-plotter 14 (see Fig. 4).

Minus $-x$ output line 39 of matrix 37 is connected through a diode "And" gate circuit 57 to the input of a conventional cathode follower amplifier 58. Gate circuit 57 only delivers a signal to cathode follower 58 upon coincidence of a $-x$ signal on line 39 and a signal at a second input from a source to be described hereinafter. The output of cathode follower 58 is coupled to the minus $-x$ storage thyratron 18 in $x$-storage unit 16 of vari-plotter 14. Minus $-y$ output line 41 on the other hand is directly coupled through a cathode follower amplifier 59 to the minus $-y$ storage thyratron 22 in $y$-storage unit 19.

The $\pm x$ output line 42 of matrix 37 is directly connected to the input of a"clear $x$ and $y$" amplifier 60 for the purpose of clearing the old contents of all thyratrons 17, 18 and 21, 22, respectively, included in the $x$-storage unit 16 and the $y$-storage unit 19 of plotter 14 at the outset of new $x$ information applied from tape printer 12; i. e., upon occurrence of a $\pm x$ signal. Amplifier 60 is preferably a triode biased below cut-off and having an R–C differentiator as a grid input circuit. Such differentiating circuit is adapted to trigger the triode on the leading edge of an input signal from $\pm x$ output line 42.

A mercury relay 61 including a solenoid 62 and normally closed contactor 63 is coupled to the amplifier 60. Solenoid 62 is connected at one side to the amplifier 60 and at the other side to a time control comprising a series resistor 64, connected to a source of positive potential 66, and a shunt capacitor 67 connected to ground. Capacitor 67 is thus normally charged to the potential of source 66, the amplifier 60 being normally cut-off. Contactor 63 is connected between a power source 68 and a power input line 65 commonly connected to plotter storage units 16, 19 and adapted to convey operating potential to the anodes of all storage thyratrons 17, 18, 21, 22 thereof, as well as to the hereinbefore mentioned second input to "And" gate 57. Consequently, upon occurrence of a signal at $\pm x$ line 42 the amplifier 60 conducts and discharges capacitor 67 through solenoid 62 of relay 61 sufficiently fast to hold contactor 63 open for approximately one millisecond. The plate voltage supplied to the storage thyratrons 17, 18, 21, 22 from source 68 is interrupted sufficiently long to allow the thyratrons to deionize, thereby clearing their old contents. If a signal appearing at $\pm x$ output line 42 is due to a $-x$ input combination to matrix 37, coincidence at "And" gate 57 of the resulting signal at minus $-x$ output line 39 and the delayed signal from contactor 63 of relay 61 upon the reclosing thereof, effects an output signal for firing the minus $-x$ storage thyratron 18 of $x$-storage unit 16 after the plate voltage is restored.

Symbol advance output line 44 of matrix 37 is connected through a conventional cathode follower amplifier 69 to the solenoid of symbol advance relay 26 disposed in control unit 23 of vari-plotter 14. Occurrence of a pulse at output line 44 consequently actuates relay 26 which in turn advances the symbol imprinter at the printing head of the vari-plotter.

The $\pm x$ and $\pm y$ output lines 42, 43 respectively, of matrix 37 are correspondingly connected to the anodes of switching diodes 71, 72 and to the cathodes of switching diodes 73, 74. Diodes 71, 72 are commonly connected at their cathodes to one side of a bias resistor 76 the other side of which is connected to a source of negative potential 77. The cathodes of diodes 71, 72 are also commonly coupled to the input of a differentiating circuit 78.

Differentiating circuit 78 may be of any suitable type for producing a fast rising output pulse corresponding in time to the leading edge of a substantially square wave input pulse. To accomplish the foregoing purpose differentiating circuit 78 is preferably an R–C differentiator.

Figure 3:
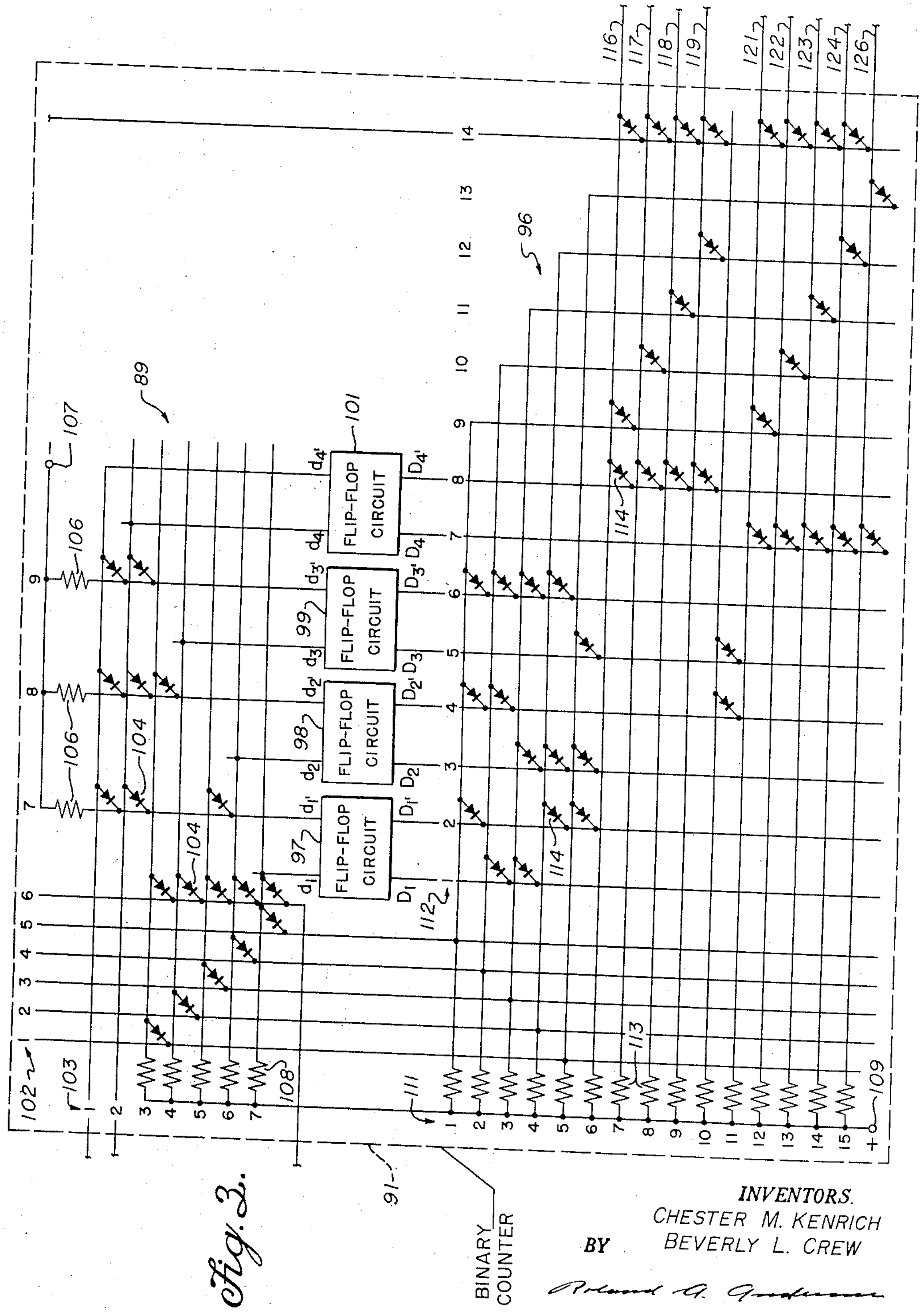
Figure 3 is a wiring diagram of a binary counter of Fig. 1.

The output of differentiating circuit 78 is coupled to the input of a jamming oscillator 79 to produce an output pulse having a fairly fast rise and very fast fall time. Such oscillator 79 is preferably a conventional blocking oscillator with the output clamped. The clamped output is commonly connected to the cathodes of diodes 81, 82, the anodes of which are respectively connected to the anodes of the diodes 73, 74, of previous mention. The commonly connected anodes of diodes 73, 81 and 74, 82 are respectively coupled through corresponding bias resistors 83, 84 to a common source of positive potential 86 and to the inputs of corresponding cathode follower amplifiers 87, 88. The outputs of such cathode followers are coupled to a diode input matrix 89 (see Fig. 3) of a synchronous binary counter 91 which will be described in detail hereinafter.

Signals occurring at either one of the $\pm x$ or $\pm y$ output lines 42, 43 are consequently applied to differentiating circuit 78 through the appropriate one of diodes 71, 72. The resulting output pulse from jamming oscillator 79 causes diodes 81, 82 to conduct. Coincident conduction of either of such diodes 81, 82 and the corresponding one of diodes 73, 74 connected to $\pm x$ and $\pm y$ output lines 42, 43, respectively, effects a jam $x$ or jam $y$ signal at the output of the appropriate one of cathode follower amplifiers 87, 88.

Stepping output line 46 of matrix 37 is connected to the input of a differentiating circuit 92, which preferably comprises a series input capacitor connected to a shunt resistor and to the cathode of a normally non-conducting diode. The diode thus conducts upon the trailing edge of a pulse applied to the input of the differentiating circuit 92 to produce a time corresponding output pulse at the anode of such diode. Consequently, a pulse is produced at the output of differentiator 92 for each stepping pulse occurring at stepping output line 46 corresponding in time to the trailing edge thereof.

A fast integrating pulse forming circuit 93 is coupled to stepping switch 24 of control unit 23 included in the vari-plotter 14. The integrating circuit 93 is connected to the contact of switch 24 corresponding to the "plot" step in the operating cycle of the plotter 14. Consequently, the switching pulse effected at the time stepping switch 24 advances from the "plot" to the "load storage units" step contact is integrated by integrating circuit 93 to form a corresponding fast rising stepping pulse at the output thereof.

The outputs of differentiating circuit 92 and integrating circuit 93 are coupled in parallel to the input of a stepping oscillator 94, which oscillator for the sake of simplicity, is advantageously selected to be similar in construction to jamming oscillator 79, i. e., a conventional blocking oscillator having a clamped output. Stepping oscillator 94 produces a substantially precise square output pulse having constant, relatively short, time duration of the order of 10 milliseconds for each pulse effected at the outputs of differentiating circuit 92 and integrating circuit 93. The output of stepping oscillator 94 is connected to input matrix 89 of binary counter 91; the manner of connection will be described in detail infra.

Considering now binary counter 91 in detail (see Fig. 3), it is to be noted that such counter is essentially octal and includes the input matrix 89 of previous mention, an output matrix 96, and four bistable trigger (flip-flop) circuits 97, 98, 99, 101 preferably Eccles-Jordan trigger pairs each including a thyratron buffer output stage, coupled between the input and output matrices 89, 96.

The input matrix 89 comprises a plurality of channels which, for convenience, will be entitled vertical channels 102 and horizontal channels 103, each individual vertical channel of which is further identified by a numerical suffix from 1 to 9 indicating successive channels from left to right and each horizontal channel of which is further identified by a numerical suffix from 1 to 7 indicating successive channels from top to bottom. Vertical and horizontal channels 102, 103, respectively, are interconnected in a complex manner by a plurality of switching diodes 104. Connection of a vertical channel 102 to a diode 104 is made at the cathode thereof while connection to a horizontal channel 103 is made at the anode. Further, vertical channels 102–7, 102–8, 102–9 are connected as "Or" gates through corresponding bias resistors 106 to a common source of negative potential 107, while horizontal channels 103–3 through 103–7, inclusive, are connected as "And" gates through corresponding bias resistors 108 to a common source of positive potential 109.

More explicitly, the previously mentioned connections of the outputs of jam *x* and jam *y* cathode followers 87, 88 respectively and stepping oscillator 94 to input matrix 89 are made as follows: cathode followers 87, 88 are respectively connected to horizontal channels 103–1, 103–2 while oscillator 94 is connected to vertical channel 102–6. Horizontal channels 103 are connected through diodes 104 to particular vertical channels 102 in accordance with the following arrangement: channels 103–1 and 103–2 are each connected to channels 102–7, 102–8, 102–9, channel 103–3 is connected to channels 102–1, 102–6, 102–8, channel 103–4 is connected to channels 102–2, 102–6, channel 103–5 is connected to channels 102–3, 102–6, 102–7, channel 103–6 is connected to channels 102–4, 102–6, channel 103–7 is connected to channels 102–5, 102–6.

Trigger pairs 97, 98, 99, 101 each has two inputs and two corresponding outputs which for convenience are indicated consecutively by the symbols $d_1$, $d_1'$, $d_2$, $d_2'$, $d_3$, $d_3'$, $d_4$, $d_4'$, denoting inputs, and $D_1$, $D_1'$, $D_2$, $D_2'$, $D_3$, $D_3'$, $D_4$, $D_4'$, denoting corresponding outputs. Trigger pairs 97, 98, 99, 101 are designed such that the trailing edge of a permissive pulse at any one of the input terminals, e. g., $d_1$ of trigger pair 97, initiates a signal at the corresponding output terminal $D_1$. Such output signal persists until the trailing edge of another input pulse applied to the other input terminal of the same trigger pair, e. g., $d_1'$ of pair 97. The signal at the first output terminal ($D_1$) is then terminated and a signal is initiated at the second output terminal ($D_1'$) which signal continues until the trailing edge of another input pulse applied to the first input terminal ($d_1$).

The input terminals of trigger pairs 97, 98, 99, 101 are connected to input matrix 89, terminals $d_1$, $d_2$, $d_3$, $d_4$, $d_4'$ being respectively connected to horizontal channels 103–7, 103–6, 103–4, 103–2, 103–1, and terminals $d_1'$, $d_2'$, $d_3'$ being respectively connected to vertical channels 102–7, 102–8, 102–9.

The output terminals of trigger pairs 97, 98, 99, 101 are connected to output matrix 96. Such matrix 96 comprises a plurality of horizontal channels 111 each of which is further identified by a numerical suffix from 1 to 15 denoting successive channels from top to bottom, and a plurality of vertical channels 112 each of which is further identified by a numerical suffix from 1 to 14 denoting successive channels from left to right. Each horizontal channel is connected as an "And" gate, i. e., through a corresponding bias resistor 113 to the positive potential source 109, of previous mention while being connected to the anodes of a plurality of appropriately arranged switching diodes 114, the cathodes of which are connected to vertical channels 112. In addition, horizontal channels 111–1 to 111–5, inclusive, are respectively directly connected to vertical channels 112–9 to 112–13, inclusive. The arrangement of the diodes 114 and direct connections of horizontal and vertical channels 111, 112, respectively, is illustrated in Table 2 which follows for the sake of simplicity. In the table, each block depicts a different one of the possible sets of horizontal and vertical channels 111, 112, respectively. An *x* in a block indicates a diode 114 coupled between the corresponding set of horizontal and vertical channels 111, 112 in the same manner described supra. The symbol 0 denotes direct connections of the channels.

*Table 2*

| 112 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 111–1 | | x | | x | | x | | | 0 | | | | | |
| 2 | x | | | x | | x | | | | 0 | | | | |
| 3 | x | | x | | | x | | | | | 0 | | | |
| 4 | | x | x | | | x | | | | | | 0 | | |
| 5 | | x | x | | x | | | | | | | | 0 | |
| 6 | | | | | | | | x | x | | | | | x |
| 7 | | | | | | | | x | | x | | | | x |
| 8 | | | | | | | | x | | | x | | | x |
| 9 | | | | | | | | x | | | | x | | x |
| 10 | | | | x | x | | | | | | | | | |
| 11 | | | | | | | x | | x | | | | | x |
| 12 | | | | | | | x | | | x | | | | x |
| 13 | | | | | | | x | | | | x | | | x |
| 14 | | | | | | | x | | | | | x | | x |
| 15 | | | | | | | x | | | | | | x | |

Output terminals $D_1$, $D_1'$; $D_2$, $D_2'$; $D_3$, $D_3'$; and $D_4$, $D_4'$ of trigger pairs 97, 98, 99, 101 are respectively connected to vertical channels 112–1 through 112–8, inclusive, of output matrix 96. Vertical channel 112–14 is connected to the output of the previously mentioned cathode follower 36. It is to be noted that horizontal channels 111–1 through 111–5 of output matrix 96 are respectively directly connected to vertical channels 102–5 through 102–1, inclusive, of input matrix 89 for the purpose of automatically resetting trigger pairs 97, 98, 99, 101 in a manner which will be hereinafter described.

Horizontal channels 111–6 through 111–9, inclusive, and 111–11 through 111–14, inclusive, respectively terminate in output lines 116 through 119, inclusive, and 121 through 124, inclusive, which will be hereinafter referred to as thousands, hundreds, tens, units, decimal digit indicator output lines of $x$ and thousands, hundreds, tens, units decimal digit indicator output lines of $y$, respectively. Similarly, horizontal channel 111–15 terminates in a "step plotter-hold printer" output line 126.

Considering now the function of synchronous counter 91 for the purposes of the present invention, it is to be recalled that tape printer 12 applies pulse words to conversion matrix 37 in serial digital form as follows:

$$\binom{\text{sign}}{x}\ 1000\ \ 100\ \ 10\ \ 1\ \text{(extra digit position)}$$

$$\binom{\text{sign}}{y}\ 1000\ \ 100\ \ 10\ \ 1\ \text{(extra digit position)}$$

A pulse is produced at the output of jam $x$ cathode follower 87 upon the occurrence of a $$\binom{\text{sign}}{x}\ \text{digit}$$

and similarly a pulse is produced at the output of jam $y$ cathode follower 88 upon the occurrence of a $$\binom{\text{sign}}{y}\ \text{digit}$$

A stepping pulse is produced at the output of stepping oscillator 94 immediately following each numerical decimal digit of the pulse word (i. e., thousands, hundreds, tens, units decimal digits of $x$ and $y$) and immediately after plotter 14 steps from the "plot" to the "load storage units" position. Further, pulses are produced at the output of clock channel cathode follower 36 corresponding to all digits (numerical and otherwise) of the pulse word. Consequently, occurrence of the $$\binom{\text{sign}}{x}\ \text{digit}$$

of the input pulse word effects a pulse at horizontal channel 103–1 of counter input matrix 89 connected to cathode follower 87. Such pulse is commonly transmitted to inputs $d_1'$, $d_2'$, $d_3'$ of trigger pairs 97, 98, 99, respectively, by vertical channels 102–7, 102–8, 102–9 due to switching of the corresponding diodes 104. The pulse is also applied to input $d_4'$ of trigger pair 101 directly connected to channels 103–1. The input condition $d_1'$, $d_2'$, $d_3'$, $d_4'$ is thus instituted in the trigger pairs, the input condition so noted indicating the input terminals which are simultaneously energized. Upon termination of the $$\binom{\text{sign}}{x}\ \text{digit}$$

the pulses applied to the trigger pairs are terminated, i. e., trailing edges of the pulses are effected. Thus, the condition $D_1'$, $D_2'$, $D_3'$, $D_4'$ is produced at the outputs of trigger pairs 97, 98, 99, 101. The condition $D_1'$, $D_2'$, $D_3'$ "picks up" horizontal channel 111–1 of output matrix 96 due to simultaneous conduction of the diodes 114 connected to such channel 113–1 and to vertical channels 112–2, 112–4, 112–6, respectively. The "picking up" of channel 111–1 effects application of a partial permissive signal to horizontal channel 111–6 via vertical channel 112–9 and the corresponding diode 114. A second partial permissive signal is applied to channel 111–6 from output $D_4'$ via vertical channel 112–8 and the corresponding diode 114. Channel 111–6 is made permissive upon application thereto of a third partial permissive pulse via vertical channel 112–14 from the output of clock channel cathode follower 36 thereby effecting a signal at the thousands decimal digit indicator output line of $x$, 116. Such indicator signal occurs for the duration of the second clock pulse appearing at the output of cathode follower 36, i. e., during the thousands decimal digit time of the input pulse word. The indicator signal is effected simultaneously with the corresponding binary pulse group at binary output lines 38 of decoding matrix 37 since the binary output exists for the duration of a corresponding clock pulse appearing at the output of clock channel cathode follower 34 the input of which is connected in parallel with the input of cathode follower 36 to the output of clock channel blocking oscillator 33.

The output condition $D_1'$, $D_2'$, $D_3'$ of trigger pairs 97, 98, 99, respectively, also effects a partial permissive signal at horizontal channel 103–7 of counter input matrix 89, since such channel is coupled via vertical channel 102–5 and the corresponding diode 104 to horizontal channel 111–1 of output matrix 96. Horizontal channel 103–7 is made instantaneously permissive upon the occurrence of a stepping pulse applied to vertical channel 102–6 connected to stepping oscillator 94 and to such horizontal channel 103–7 by a corresponding diode 104. The stepping pulse corresponds to the trailing edge of the thousands binary output of previous mention produced at binary output lines 38 of decoding matrix 37. The instantaneous permissive pulse so produced at horizontal channel 103–7 triggers input terminal $d_1$ of trigger pair 97 connected thereto thus effecting the overall trigger pair output condition $D_1$, $D_2'$, $D_3'$, $D_4'$. Such condition "picks up" horizontal channel 111–2 of counter output matrix 96 to effect a signal at the hundreds decimal digit indicator output line of $x$ 117, as well as, subsequently effecting appropriate resetting of trigger pairs 97, 98, 99, 101.

The complete switching sequence of synchronous counter 91 may best be illustrated by Table 3 which follows. In the table the first column indicates consecutive input conditions of trigger pairs 97, 98, 99, 101 (i. e., the trigger pair input terminals simultaneously energized), the second column indicates the corresponding output conditions of trigger pairs 97, 98, 99, 101, the third column denotes the corresponding primary channels 111 of matrix 96 affected (i. e., "picked up" by the output condition of trigger pairs 97, 98, 99), as well as, the secondary channels 111 of matrix 96 affected (i. e., "picked up" by the primary channel and the output of trigger pair 101), the fourth column indicates the corresponding output line at which a signal is produced, the fifth column denotes the corresponding horizontal channel 103 of matrix 89 which is rendered permissive, and the sixth column indicates the input terminal of trigger pairs 97, 98, 99, 101 correspondingly reset to effect the next succeeding input condition shown in column 1.

TABLE 3

| Input condition of trigger pairs 97, 98, 99, 101 | Output condition of trigger pairs | Horizontal channels 111 of matrix 96 affected | | Signal produced at output line | Horizontal channel 103 of input matrix 89 affected | Input terminal of trigger pairs reset |
|---|---|---|---|---|---|---|
| | | Prim. | Second. | | | |
| (Jam $x$) | | | | | | |
| $d_1', d_2', d_3', d_4'$ | $D_1', D_2', D_3', D_4'$ | 111-1 | 111-6 | 116 ($x$ 1000) | 103-7 | $d_1$ |
| $d_1', d_2', d_3', d_4'$ | $D_1, D_2', D_3', D_4'$ | 111-2 | 111-7 | 117 ($x$ 100) | 103-6 | $d_2$ |
| $d_1, d_2, d_3', d_4'$ | $D_1, D_2, D_3', D_4'$ | 111-3 | 111-8 | 118 ($x$ 10) | 103-5 | $d_1'$ |
| $d_1', d_2, d_3', d_4'$ | $D_1', D_2, D_3', D_4'$ | 111-4 | 111-9 | 119 ($x$ 1) | 103-4 | $d_3$ |
| $d_1', d_2, d_3, d_4'$ | $D_1', D_2, D_3, D_4'$ | 111-5 | ------ | --- ------------ | ------- | ------ |
| (Jam $y$) | | | | | | |
| $d_1', d_2', d_3', d_4$ | $D_1', D_2', D_3', D_4$ | 111-1 | 111-11 | 121 ($y$ 1000) | 103-7 | $d_1$ |
| $d_1, d_2', d_3', d_4$ | $D_1, D_2', D_3', D_4$ | 111-2 | 111-12 | 122 ($y$ 100) | 103-6 | $d_2$ |
| $d_1, d_2, d_3', d_4$ | $D_1, D_2, D_3', D_4$ | 111-3 | 111-13 | 123 ($y$ 10) | 103-5 | $d_1'$ |
| $d_1', d_2, d_3', d_4$ | $D_1', D_2, D_3', D_4$ | 111-4 | 111-14 | 124 ($y$ 1) | 103-4 | $d_3$ |
| $d_1', d_2, d_3, d_4$ | $D_1', D_2, D_3, D_4$ | 111-5 | 111-15 | 126 Step plotter Hold printer | 103-3 | $d_2'$ |
| $d_1', d_2', d_3, d_4$ | $D_1', D_2', D_3, D_4$ | 111-10 | ------ | ------ ---------- | ------- | ------ |

It is to be noted from Table 3 that upon application of a jam $x$ signal from cathode follower 87, synchronous counter 91 is stepped auotmatically to produce a sequential series of thousands, hundreds, tens, units $x$ decimal digit indicator signals at output lines 116 to 119, inclusive, respectively. Such indicator signals are coincident with the corresponding binary coded pulse groups produced at output lines 38 of decoding matrix 37. Upon effecting the units indicator signal, counter 91 is stepped to "pick up" channel 111–5 of output matrix 96, but no secondary channel coupled to an output line is affected. Hence, the counter remains in an output state corresponding to the extra digit position of the input pulse word until a jam $y$ signal is applied thereto from cathode follower 88. The jam $y$ signal steps the counter to produce a sequential series of thousands, hundreds, tens, units $y$ decimal digit indicator sginals at output lines 121 to 124, inclusive, respectively, followed by a "step plotter-hold printer" signal at output line 126. Counter 91 is stepped due to the hereinbefore mentioned switching pulse at plotter stepping switch 24 subsequent to the plot step, to a "no plot" position which corresponds to horizontal channel 111–10 of output matrix 96 and produces no output. The counter remains in the "no plot" position until application of another jam $x$ signal.

The thousands, hundreds, tens, units $x$ decimal digit indicator output lines 116, 117, 118, 119 of counter output matrix 96 are respectively connected to the grids of the thousands, hundreds, tens, units rows of $x$ storage thyratrons 17 of $x$ storage unit 16 of plotter 14. Similarly, the thousands, hundreds, tens, units $y$ decimal digit indicator output lines 121, 122, 123, 124 are respectively connected to the grids of the thousands, hundreds, tens, units rows of $y$ storage thyratrons 21 of $y$ storage unit 19.

The "step plotter-hold printer" output line 126 of counter output matrix 96 is coupled in parallel to the inputs of two similar amplifiers 127, 128 which are preferably triode driver stages biased below cut-off, similar in design to the clear $x$ and $y$ amplifier 60 of previous mention. Mercury relays 129, 131 respectively including solenoids 132, 133 and normally open contactors 134, 136 are coupled to the plate circuits of amplifiers 127, 128, respectively. Solenoid 132 is connected at one side to the amplifier 127 and at the other side to a time control comprising a series resistor 137 connected to a source of positive potential 138, and a shunt capacitor 139 connected to ground. Capacitor 139 is thus normally charged to the potential of source 138, amplifier 127 being normally cut-off. Solenoid 133 on the other hand is connected at one side to the amplifier 128 and at the other side directly to source 138.

Normally open contactor 134 is connected between a suitable source of positive potential 141 and an output conductor 142 which is, in turn, connected to the operating solenoid of control unit stepping switch 24 of plotter 14.

Normally open contactor 136 is connected between a suitable source of negative potential 143 and an output conductor 144 which is, in turn, connected to drive motor 13 of tape printer 12.

Upon occurrence of a signal at step plotter-hold printer output line 126 of counter output matrix 96, amplifiers 127, 128 conduct to respectively discharge capacitor 139 through solenoid 132 of relay 129 and energize solenoid 133 of relay 131 with current from source 138. Relay contactor 134 is thus momentarily closed thereby applying a positive pulse to the solenoid of stepping switch 24 and relay contactor 136 is closed to apply a negative potential from source 143 to drive motor 13, for the duration of the signal from step plotter-hold printer output line 126. Such positive pulse and continuous negative bias, respectively, step plotter 14 to the "plot" position and stops tape printer 12 until the signal at output line 126 is terminated; i. e., until the switching pulse generated at plotter stepping switch 24 subsequent to the plot cycle effects stepping of counter 91 off of output line 126 to the "no plot" position. Thus, printer 12 does not read subsequent pulse information into converter input terminals 28 until the previous pulse word is plotted by vari-plotter 14 and same automatically steps to the "load storage units" cycle position.

The overall operation of the converter 11 of the present invention may be best described by reference to a specific example. Consider the converter, as illustrated in the drawing and hereinbefore described, energized with input information from tape printer 12 and driving variplotter 14. More particularly, consider the following pulse word as being read by tape printer 12 and applied from output channels 27 thereof to converter input terminals 28 in serial digital form: $-x$ 4357 (symbol advance) $y$ 5568. Using conventional binary notation, the foregoing pulse word appears as excess-3 coded serial groups at converter input terminals 28–1 through 28–6, inclusive, of 010001, 000111, 000110, 001000, 001010, 110100, 110011, 001000, 001000, 001001, 001011. A corresponding chain of clock pulses is synchronously applied to converter input terminal 28–7 from tape printer 12, each pulse corresponding in time to a different one of the digit positions (pulse groups) of the input pulse word. The clock pulses are shaped by blocking oscillator 33 and the precise square pulses so formed are applied simultaneously through cathode followers 34, 36 as partial permissive pulses to decoding matrix 37 and output matrix 96 of synchronous counter 91 to gate the outputs thereof.

The first coded pulse group 010001 (viz., $-x$) is applied to Schmitt trigger circuits 29 thus effecting a corresponding pulse combination at the outputs thereof and energizing appropriate ones of vertical channels 47 of decoding matrix 37. Such pulse combination together with the first clock pulse effect simultaneous output pulses at $-x$ and $\pm x$ output lines 39 and 42, respectively, of matrix 37. The $\pm x$ pulse is applied to clear $x$ and $y$ amplifier 60 and, at the same time, produces a jam $x$ signal at cathode follower 87. Relay 61 coupled to the plate circuit of amplifier 60 is consequently actuated, contactor 63 thereof momentarily disconnecting the plate power supply 68 from all storage thyratrons 17, 18, 21, 22 of plotter 14 thus clearing their old contents. Upon the reclosing of contactor 63 the plate voltage is restored to the thyratrons 17, 18 and a signal is applied to "And" gate 57 which combines with the signal appearing at $-x$ output line 39 to produce a signal for firing $-x$ storage thyratron 18 of plotter $x$ storage unit 16.

The jam $x$ signal at cathode follower 87 is applied to input matrix 89 of synchronous counter 91 thereby appropriately priming the inputs of trigger pairs 97, 98, 99, 101 as shown in the foregoing table 3. A corresponding output is applied from the trigger pairs to counter output matrix 96 upon the trailing edge of the jam $x$ signal.

Occurrence of the second coded pulse group 000111 (viz., excess-3 coded 4) together with the second clock pulse at converter input terminals 28 respectively effect corresponding excess-3 energization of decoding matrix 37 and simultaneous application of partial permissive gate pulses to such decoding matrix 37 and counter output matrix 96. A pulse is consequently produced at the decoding matrix straight binary 4 output line 38–2 simultaneously with a pulse at decoding matrix stepping output line 46 and a signal at thousands $x$ decimal digit indicator line 116 of counter output matrix 96 due to the condition set up in trigger pairs 97, 98, 99, 101 by the previous jam $x$ signal. The binary pulse at channel 38–2 is applied as a half permissive signal by the corresponding driver amplifier 56 to the grids of all $x$ and $y$ storage thyratrons 17, 21 comprising the second column (binary-4 column) of plotter $x$ and $y$ storage units 16, 19, respectively. Similarly, the thousands $x$ decimal digit signal at line 116 is applied as a half permissive signal to the grids of the $x$-storage thyratrons 17 comprising the first row ($x$ 1000 row) of $x$ storage unit 16. Thus the second thyratron 17 of the first row of $x$ storage unit 16 is fired to set up the $x$ digit condition 4000 in the servo circuit of the vari-plotter 14.

The simultaneous pulse, mentioned above, produced at decoding matrix stepping output line 46 is differentiated by differentiating circuit 92 to trigger stepping oscillator 94 on the trailing edge of such pulse, i. e., immediately upon termination of the simultaneous signals produced at binary 4 output line 38–2 and thousands $x$ decimal digit indicator line 116 loading $x$ storage unit 16. Stepping oscillator 94 applies a corresponding stepping pulse to input matrix 89 of counter 91 which effects resetting of trigger pairs 97, 98, 99, 101, as shown in the foregoing Table 3 and hereinbefore described.

The third coded input pulse group 000110 (viz., excess-3 coded 3) in combination with the third clock pulse effects pulses at decoding matrix binary 2 and 1 output lines 38–3, 38–4, respectively, and stepping output line 46 simultaneously with a signal at hundreds $x$ decimal digit indicator line 117 in a manner similar to that described above. Thus the third and fourth thyratrons 17 of the second row of plotter $x$ storage unit 16 are loaded to set up the $x$ condition 300. Subsequent to loading of the plotter 14, counter 91 is stepped to the next consecutive reset condition.

The fourth and fifth coded input pulse groups 001000, 001010 respectively (i. e. excess-3 coded 5 and 7 respectively) effect consecutive loading of the second and fourth thyratrons 17 of the third row and the second, third, and fourth thyratrons of the fourth row of plotter $x$ storage unit 16, respectively, thus establishing $x$ conditions of 50 and 7. Counter 91 is stepped to the no output condition, of previous mention, subsequent to loading of the units decimal digit by the stepping pulse corresponding thereto.

The sixth coded input pulse group 110100 (viz., symbol advance) effects a pulse at symbol advance output line 41 of decoding matrix 37. Such pulse is applied by cathode follower 69 to the symbol advance relay 26 at the plotter control unit 23. The relay 26 is thus actuated, stepping the plotter printing head to a different symbol. It is to be noted that no pulse is produced at decoding matrix stepping output line 46 for the symbol advance input pulse group and therefore counter 91 remains in the aforementioned no output condition.

The seventh input pulse group 110011 (viz., +y) is decoded by matrix 37 to produce a pulse at $\pm y$ output line 43 thereof. The $\pm y$ pulse effects a jam $y$ signal which is applied by cathode follower 88 to input matrix 89 of synchronous counter 91 thereby resetting the trigger pairs 97, 98, 99, 101 to the jam $y$ condition shown in Table 3. Upon termination of the jam $y$ signal the corresponding condition is set up in output matrix 96 to prime the thousands $y$ decimal digit indicator output line 121 thereof.

Upon occurrence of the eighth input pulse group 001000 (i. e., excess-3 coded 5) and corresponding clock pulse, thousands $y$ decimal digit output line 121 is rendered permissive to produce a signal simultaneously with pulses at binary 4 and 1 output lines 38–2, 38–4, respectively, of decoding matrix 37. The second and fourth thyratrons 21 of the first row of $y$ storage unit 19 are thus fired to establish the $y$ condition 5000 in the servo system of plotter 14. A pulse effected at stepping output line 46 of decoding matrix 37 simultaneously with the foregoing binary pulses steps counter 91 to the next successive input condition shown in Table 3.

The remaining ninth, tenth, eleventh input pulse groups 001000, 001001, 001011 (viz., excess-3 coded 5, 6, 8 respectively) are processed by the converter 11 of the present invention in a manner similar to that described above in regard to the $x$ decimal digits of the input pulse word. The second and fourth thyratrons 21 of the second row, second and third thyratrons of the third row, and first thyratron of the fourth row of $y$ storage unit 19 of plotter 14 are thus loaded in respective row sequence to establish the corresponding $y$ conditions: 500, 60, 8 in the plotter servo circuit.

The trailing edge of the stepping pulse corresponding to the $y$ units decimal digit effects stepping of counter 91 to produce a signal at "step plotter-hold printer" output line 126. Thus, relays 129, 131 are actuated to step the stepping switch 24 of plotter control unit 23 to the "plot" cycle position and stop the drive motor 13 of the tape printer 12 to prevent same from reading further pulse information into the converter 11. In the "plot" cycle the printing head of the plotter 14 is automatically actuated to plot the point $-x$ 4357, $y$ 5568. Subsequent to printing the foregoing point, plotter 14 is automatically stepped to the "load storage units" cycle position, thereby applying a switching pulse to integrator 93 and thus triggering stepping oscillator 94. Such oscillator generates a pulse which steps synchronous counter 91 to the stable no output "no plot" condition, hereinbefore described, thereby terminating the signal at step plotter-hold printer output line 126 and releasing tape printer 12 to read further pulse information. Each subsequent pulse word of a solution to a problem solved by the previously-referenced computer and read by the tape printer 12 thereof is similarly converted by the converter 11 of the present invention to suitable straight binary decimal digit information for application to the plotter 14, whereby a graphical answer to said problem is directly obtained.

It is to be noted that the converter 11 of the present invention possesses the important advantage of discriminating between "legal" and "illegal" input pulse information supplied by tape printer 12. The former term, as hereinbefore defined, refers to coded numerical decimal digits and the various coded symbols utilized for the purposes of the present invention, while the latter term refers to coded alphabetic letters and symbols other than those utilized in the present invention. The converter 11 is responsive to algebraic sign symbols (i. e., ±*x* and ±*y*) after which it accordingly prepares the corresponding storage unit of plotter 14 for loading only the next successive four numerical decimal digits, ignoring any illegal information (e. g., alphabetic characters) that may occur between said four decimal digits. After the first four decimal digits have passed, all other decimal digits will be ignored, unless preceded by another algebraic sign symbol. Thus, the input pulse word applied to converter 11 may contain information utilized for various purposes other than for those of the present invention and yet the converter will extract only the "legal" portion of the information for appropriate actuation of the plotter 14.

While the invention has been disclosed with respect to a single preferred embodiment, it will be apparent to those skilled in the art that numerous variations and modifications may be made within the spirit and scope of the invention and thus it is not intended to limit the invention except as defined in the following claims.

What is claimed is:

1. A device for converting excess-3 coded pulse words of a type having an *x* algebraic sign digit followed serially by a plurality of decimal digits in order of decreasing significance and a *y* algebraic sign digit followed by a plurality of decimal digits in order of decreasing significance to corresponding serial straight binary coded pulse groups and simultaneous *x* and *y* decimal digit indicator signals, comprising input means adapted to receive said excess-3 coded pulse words, a switching matrix coupled to said input means internally connected to produce serial straight binary coded pulse groups indicative of said excess-3 coded input, a synchronous counter having a plurality of *x* decimal digit and a plurality of *y* decimal digit indicator terminals, and means coupled between said matrix and said counter for stepping said counter in synchronism with the serial binary pulse group output from said matrix to successively produce pulses at corresponding ones of the *x* and *y* decimal digit indicator terminals of said counter.

2. An excess-3 to binary converter comprising input means receptive to excess-3 coded pulse words of a type having an *x* algebraic sign digit followed serially by a plurality of decimal digits in order of decreasing significance and a *y* algebraic sign digit followed serially by a plurality of decimal digits in order of decreasing significance, a switching matrix coupled to said input means and having ±*x*, ±*y*, −*x*, −*y* output terminals in addition to a stepping output terminal and binary output terminals, said matrix internally connected to selectively produce pulses at said ±*x*, ±*y*, −*x*, −*y* output terminals in response to the *x* and *y* algebraic sign digits of the input pulse word and a pulse at said stepping output terminal simultaneously with straight binary coded pulse groups at said binary output terminals in responsive correspondence to the decimal digits of the excess-3 coded input pulse word, a synchronous counter having a plurality of *x* decimal digit and a plurality of *y* decimal digit indicator terminals, trigger means coupled between said matrix ±*x* and ±*y* terminals and said counter for establishing input energizing conditions in said counter to selectively produce pulses at the most significant *x* and *y* decimal digit indicator terminals thereof in response to pulses at said ±*x* and ±*y* terminals respectively, and means coupled between said matrix stepping output terminal and said counter for stepping said counter off of said most significant *x* and *y* decimal digit indicator terminals to produce pulses at successive remaining ones thereof in order of decreasing significance in response to the trailing edges of pulses at said matrix stepping terminal in synchronism with corresponding ones of said straight binary coded pulse groups.

3. An excess-3 to binary converter as defined by claim 2 further defined by said switching matrix comprising a plurality of interconnected "And" or "Or" gate circuits terminating in said ±*x*, ±*y*, −*x*, −*y* straight binary, and stepping output terminals.

4. An excess-3 to binary converter comprising input means receptive to excess-3 coded pulse words of a type having an *x* algebraic sign digit followed serially by a plurality of decimal digits in order of decreasing significance preceding a *y* algebraic sign digit followed serially by a plurality of decimal digits in order of decreasing significance, a switching matrix coupled to said input means and having ±*x*, ±*y*, −*x*, −*y* output terminals together with a stepping output terminal and binary output terminals, said matrix comprising a plurality of interconnected "And" and "Or" gate circuits to selectively produce pulses at said ±*x*, ±*y*, −*x*, −*y* output terminals in accordance with the *x* and *y* algebraic sign digits of the input pulse word and a pulse at said stepping output terminal simultaneously with straight binary coded pulse groups at said binary output terminals corresponding to the decimal digits of the excess-3 coded input, a synchronous counter having a plurality of *x* decimal digit and a plurality of *y* decimal digit indicator terminals, trigger means coupled between said matrix ±*x* and ±*y* terminals and said counter for establishing input energizing conditions in said counter to selectively produce pulses at the most significant *x* and *y* decimal digit indicator terminals thereof in response to pulses at said ±*x* and ±*y* terminals respectively, a trailing edge differentiating circuit connected to said matrix stepping terminal to produce trigger pulses corresponding to the trailing edges of the pulses produced at said stepping terminal, and a relaxation oscillator connected between said differentiating circuit and said counter generating pulses in response to said trigger pulses for stepping said counter off of said most significant *x* and *y* decimal digit indicator terminals to produce pulses at successive remaining ones thereof in order of decreasing significance subsequent to each one of said binary coded pulse groups corresponding to the preceding decimal digit indicator pulse of next higher significance.

5. An excess-3 to binary converter comprising input means receptive to excess-3 coded pulse words of a type having an *x* algebraic sign digit followed serially by a plurality of decimal digits in order of decreasing significance preceding a *y* algebraic sign digit followed serially by a plurality of decimal digits in order of decreasing significance, a switching matrix coupled to said input means and having ±*x*, ±*y*, −*x*, −*y* output terminals together with a stepping output terminal and binary output terminals, said matrix internally connected to selectively produce pulses at said ±*x*, ±*y*, −*x*, −*y* output terminals in accordance with the *x* and *y* algebraic sign digits of the input pulse word and a pulse at said stepping output terminal simultaneously with straight binary coded pulse groups at said binary output terminals in responsive correspondence to the decimal digits of the excess-3 coded input, a synchronous counter comprising a plurality of trigger pairs, an input matrix coupled to said trigger pairs and interconnected to energize said trigger pairs according to a prearranged series of different energization conditions, an output matrix coupled to said plurality of trigger pairs having a plurality of *x* decimal digit and a plurality of *y* decimal digit indicator terminals and interconnected to produce a signal at successively less significant ones thereof in response to said prearranged series of energization conditions, and reset means coupled between said output and input matrices, trigger means coupled between said switching matrix ±*x* and ±*y* terminals and said counter input matrix whereby pulses at said ±*x* and ±*y* terminals effect selective energization of said trigger pairs according to the ones of said prearranged energization conditions corresponding to the most significant ones of said *x* and *y* decimal digit indicator terminals respectively, pulse generating means coupled between said switching matrix stepping terminals and said counter reset means responsive to the trailing edges of pulses at said stepping terminal for stepping said input matrix to effect said prearranged sequence of different energization condition, and gating means commonly coupled to said switching matrix and said counter output matrix for effecting precisely simultaneous occurrences of said binary coded pulse groups and said decimal digit indicator signals.

6. An excess-3 to binary converter as described in claim 5 wherein said pulse generating means comprises a trailing edge differentiating circuit connected to said switching matrix stepping terminal, and a relaxation oscillator connected between said differentiating circuit and said counter reset means.

7. In an excess-3 to straight binary converter adapted to be energized by a multiple channel source of excess-3 coded pulse words of a type having an $x$ algebraic sign digit followed serially by a plurality of decimal digits in order of decreasing significance preceding a $y$ algebraic sign digit followed serially by a plurality of decimal digits in order of decreasing significance, said source including means for generating clock pulses in synchronism with the digits of each pulse word, the combination comprising a plurality of channel input terminals each one for connection to a different one of said channels of said source, a plurality of trigger circuits each having an input terminal and normally primed and normally unprimed output terminals, said trigger circuit input terminals correspondingly connected to said channel input terminals for generating pulses at said normally unprimed output terminals and terminating pulses at said normally primed output terminals in response to pulses at said trigger input terminals, a switching matrix connected to the output terminals of said plurality of trigger circuits and having $\pm x$, $\pm y$, $-x$, $-y$ output terminals in addition to a stepping output terminal and binary output terminals, said switching matrix comprising a plurality of "And" and "Or" gate circuits interconnected to selectively produce pulses at said $\pm x$, $\pm y$, $-x$, $-y$ output terminals in accordance with the $x$ and $y$ algebraic sign digits of an input pulse word and a pulse at said stepping output terminal simultaneously with straight binary coded pulse groups at said binary output terminals responsively corresponding to the decimal digits of the excess-3 coded input, a synchronous counter having a plurality of $x$ decimal digit and a plurality of $y$ decimal digit indicator terminals, trigger means coupled between said matrix $\pm x$ and $\pm y$ terminals and said counter for establishing energizing input conditions in said counter to selectively produce pulses at the most significant $x$ and $y$ decimal digit indicator terminals thereof in response to pulses at said $\pm x$ and $\pm y$ terminals respectively, means coupled between said matrix stepping output terminal and said counter for stepping said counter off of said most significant $x$ and $y$ decimal digit indicator terminals to produce pulses at successive remaining ones thereof in order of decreasing significance in response to the trailing edges of pulses at said matrix stepping terminal, and means commonly coupling said source clock pulse generating means in gating relationship to said matrix and said counter for effecting synchronous occurrences of pulses at said matrix output terminals and said counter indicator terminals.

8. The device as described in claim 7 wherein said trigger circuits are Schmitt trigger circuits.

9. In an excess-3 to straight binary converter adapted to be energized by a multiple channel source of excess-3 coded pulse words of a type having an $x$ algebraic sign digit followed serially by a plurality of decimal digits in order of decreasing significance preceding a $y$ algebraic sign digit followed serially by a plurality of decimal digits in order of decreasing significance, said source including means for generating clock pulses in synchronism with the digits of each pulse word, the combination comprising a plurality of channel input terminals each one for connection to a different one of said channels of said source, a plurality of trigger circuits each having an input terminal and normally primed and normally unprimed output terminals, said trigger circuit input terminals correspondingly connected to said channel input terminals for generating pulses at said normally unprimed output terminals and terminating pulses at said normally primed output terminals in response to pulses at said trigger input terminals, a switching matrix connected to the output terminals of said plurality of trigger circuits and having $\pm x$, $\pm y$, $-x$, $-y$ output terminals together with a stepping output terminal and binary output terminals, said switching matrix comprising a plurality of "And" and "Or" gate circuits interconnected to selectively produce pulses at said $\pm x$, $\pm y$, $-x$, $-y$ output terminals in accordance with the $x$ and $y$ algebraic sign digits of an input pulse word and a pulse at said stepping output terminal simultaneously with straight binary coded pulse groups at said binary output terminals in responsive correspondence to the decimal digits of the excess-3 coded input, a synchronous counter having a plurality of $x$ decimal digit and a plurality of $y$ decimal digit indicator terminals, trigger means coupled between said matrix $\pm x$ and $\pm y$ terminals and said counter for establishing energizing input conditions in said counter to selectively produce pulses at the most significant $x$ and $y$ decimal digit indicator terminals thereof in response to pulses at said $\pm x$ and $\pm y$ terminals respectively, a trailing edge differentiating circuit connected to said matrix stepping terminal to produce trigger pulses corresponding to the trailing edges of pulses produced at said stepping terminal, a relaxation oscillator connected between said differentiating circuit and said counter generating pulses in response to said trigger pulses for stepping said counter off of said most significant $x$ and $y$ decimal digit indicator terminals to produce pulses at successive remaining ones thereof in order of decreasing significance, and means commonly coupling said source clock pulse generating means in gating relationship to said matrix and said counter for effecting synchronous occurrences of pulses at said matrix output terminals and said counter indicator terminals.

10. The device as described in claim 9 wherein said trigger circuits are Schmitt trigger circuits.

11. In an excess-3 to straight binary converter adapted to be energized by a multiple channel source of excess-3 coded pulse words of a type having an $x$ algebraic sign digit followed serially by a plurality of decimal digits in order of decreasing significance preceding a $y$ algebraic sign digit followed serially by a plurality of decimal digits in order of decreasing significance, said source including means for generating clock pulses in synchronism with each digit of the pulse word, the combination comprising a plurality of channel input terminals each one for connection to a different one of said channels of said source, a plurality of trigger circuits each having an input terminal and normally primed and normally unprimed output terminals, said trigger circuit input terminals correspondingly connected to said channel input terminals for generating pulses at said normally unprimed output terminals and terminating pulses at said normally primed output terminals in response to pusles at said trigger input terminals, a switching matrix connected to the output termials of said plurality of trigger circuits and having $\pm x$, $\pm y$, $-x$, $-y$ output terminals in addition to a stepping output terminal and binary output terminals, said switching matrix comprising a plurality of "And" and "Or" gate circuits interconnected to selectively produce pulses at said $\pm x$, $\pm y$, $-x$, $-y$ output terminals in accordance with the $x$ and $y$ algebraic sign digits of an input pulse word and a pulse at said stepping output terminal simultaneously with straight binary coded pulse groups at said binary output terminals in responsive correspondence to the decimal digits of the excess-3 coded input, a synchronous counter comprising a plurality of trigger pairs, an input matrix coupled to said trigger pairs and interconnected to energize said trigger pairs according to a pre-arranged series of different energization conditions, an output matrix coupled to said plurality of trigger pairs having a plurality of $x$ decimal digit and a plurality of $y$ decimal digit indicator terminals and interconnected to produce a signal at successively less significant ones of the plurality of $x$ decimal digit and the plurality of $y$ decimal digit indicator terminals in response to said pre-arranged series of energization conditions, and reset means coupled between said output and input matrices, trigger means coupled between said switching matrix $\pm x$ and $\pm y$ terminals and said counter input matrix whereby pulses at said $\pm x$ and $\pm y$ terminals effect selective energization of said trigger pairs according to the ones of said pre-arranged energization conditions corresponding to the most significant ones of said $x$ and $y$ decimal digit indicator terminals respectively, pulse generating means coupled between said switching matrix stepping terminal and said counter reset means responsive to the trailing edges of pulses at said stepping terminal for stepping said input matrix to effect said pre-arranged sequence of different energization conditions, and means commonly coupling said source clock pulse generating means in gating relationship to said switching matrix and said counter output matrix for effecting synchronous occurrences of pulses at said switching matrix output terminals and said counter indicator terminals.

12. The device as described in claim 11 wherein said trigger circuits are Schmitt trigger circuits.

13. The device as described in claim 11 wherein said pulse generating means comprises a trailing edge differentiating circuit connected to said switching matrix stepping terminal, and a relaxation oscillator connected between said differentiating circuit and said counter reset means.

14. In an excess-3 to straight binary converter adapted to be energized by a multiple channel source of excess-3 coded pulse words of a type having an $x$ algebraic sign digit followed serially by a plurality of decimal digits in order of decreasing significance preceding a $y$ algebraic sign digit followed serially by a plurality of decimal digits in order of decreasing significance, said source including means for generating clock pulses in synchronism with each digit of a pulse word, the combination comprising a plurality of channel input terminals each one for connection to a different one of said channels of said source, a plurality of Schmitt trigger circuits each having an input terminal and normally primed and normally unprimed output terminals, said trigger circuit input terminals correspondingly connected to said channel input terminals for generating pulses at said normally unprimed output terminals and terminating pulses at said normally primed output terminals in response to pulses at said trigger input terminals, a switching matrix connected to the output terminals of said plurality of trigger circuits and having $\pm x$, $\pm y$, $-x$, $-y$ output terminals in addition to a stepping output terminal and binary output terminals, said switching matrix comprising a plurality of "And" and "Or" gate circuits interconnected to selectively produce pulses at said $\pm x$, $\pm y$, $-x$, $-y$ output terminals in accordance with the $x$ and $y$ algebraic sign digits of an input pulse word and a pulse at said stepping output terminal simultaneously with straight binary coded pulse groups at said binary output terminals in responsive correspondence to the decimal digits of the excess-3 coded input, a synchronous counter comprising a plurality of trigger pairs, an input matrix coupled to said trigger pairs and interconnected to energize said trigger pairs according to a pre-arranged series of different energization conditions, an output matrix coupled to said plurality of trigger pairs having a plurality of $x$ decimal digit and a plurality of $y$ decimal digit indicator terminals and interconnected to produce a signal at successively less significant ones of the plurality of $x$ decimal digit and the plurality of $y$ decimal digit indicator terminals in response to said pre-arranged series of energization conditions, and reset means coupled between said output and input matrices, trigger means coupled between said switching matrix $\pm x$ and $\pm y$ terminals and said counter input matrix whereby pulses at said $\pm x$ and $\pm y$ terminals effect selective energization of said trigger pairs according to the ones of said pre-arranged energization conditions corresponding to the most significant ones of said $x$ and $y$ decimal digit indicator terminals respectively, a trailing edge differentiating circuit connected to said switching matrix stepping terminal, a relaxation oscillator connected between said differentiating circuit and said counter reset means, and means commonly coupling said source clock pulse generating means in gating relationship to said switching matrix and said counter output matrix for effecting synchronous occurrences of pulses at said switching matrix output terminals and said counter indicator terminals.

15. An excess-3 to binary converter comprising input means receptive to excess-3 coded pulse words of a type having an $x$ algebraic sign digit followed serially by thousands, hundreds, tens, units decimal digits preceding a $y$ algebraic sign digit followed serially by thousands, hundreds, tens, units decimal digits, a switching matrix coupled to said input means and having $\pm x$, $\pm y$, $-x$, $-y$ output terminals together with a stepping output terminal, and binary output terminals, said matrix comprising a plurality of "And" and "Or" gate circuits interconnected to selectively produce pulses at said $\pm x$, $\pm y$, $-x$, $-y$ output terminals in accordance with the $x$ and $y$ algebraic sign digits of the input pulse word and a pulse at said stepping output terminal simultaneously with straight binary coded pulse groups at said binary output terminals in corresponding response to each one of the decimal digits of an excess-3 coded input word, first, second, third, and fourth trigger pairs each having first and second input and corresponding first and second output terminals, first, second, and third "Or" gate circuits respectively connected in energizing relationship to said second input terminals of said first, second, and third trigger pairs, triggering means coupling said matrix $\pm x$ terminal to said "Or" gate circuits and to said second input terminal of said fourth trigger pair, triggering means coupling said matrix $\pm y$ terminal to said "Or" gate circuits and to said first input terminal of said fourth trigger pair, a first "And" gate circuit receptively connected to said second output terminals of said first, second, and third trigger pairs, a second "And" gate circuit receptively connected to said first output terminal of said first trigger pair and said second output terminals of said second and third trigger pairs, a third "And" gate circuit receptively connected to said first output terminals of said first and second trigger pairs and to said second output terminal of said third trigger pair, a fourth "And" gate circuit receptively connected to said second output terminals of said first and third trigger pairs and to said first output terminal of said second trigger pair, a fifth "And" gate circuit receptively connected to said second output terminal of said first trigger pair and to said first output terminals of said second and third trigger pairs, a sixth "And" gate circuit receptively connected to said second output terminal of said second trigger pair and to said first output terminal of said third trigger pair, reset gating means respectively coupling said first, second, third, fourth, and fifth "And" gate circuits to said first input terminal of said first trigger pair, said first input terminal of said second trigger pair, said first "Or" gate circuit, said first terminal of said third trigger pair, and said second "Or" gate circuit, pulse generating means coupled in gating relationship between said switching matrix stepping terminal and said reset gating means responsive to the trailing edges of pulses at said stepping terminal, thousands, hundreds, tens, units $x$ decimal digit indicator terminals, an $x$ output gate circuit respectively coupling said first, second, third, fourth "And" gate circuits to said thousands, hundreds, tens, units $x$ decimal digit indicator terminals, means coupling said second output terminal of said fourth trigger pair in gating relationship to said $x$ output gate circuit, thousands, hundreds, tens, units $y$ decimal digit indicator terminals, a pulse word termination indicator terminal, a $y$ output gate circuit respectively coupling said first, second, third, fourth, and fifth "And" gate circuits to said thousands, hundreds, tens, units $y$ decimal digit indicator terminals and said pulse word termination indicator terminal, means coupling said first output terminal of said fourth trigger pair in gating relationship to said $y$ output gate circuit, and synchronous gating means commonly coupled to said switching matrix and said $x$ and $y$ output gate circuits for effecting precisely simultaneous occurrences of said binary coded pulse groups and pulses at said indicator terminals.

16. An excess-3 to binary converter as described in claim 15 wherein said pulse generating means comprises a trailing edge differentiating circuit connected to said matrix stepping terminal, and a relaxation oscillator connected between said differentiating circuit and said reset gating means in gating relationship thereto.

17. In an excess-3 to straight binary converter adapted to be energized by a multiple channel source of excess-3 coded pulse words of a type having an $x$ algebraic sign digit followed serially by thousands, hundreds, tens, units decimal digits preceding a $y$ algebraic sign digit followed serially by thousands, hundreds, tens, units decimal digits, said source including means for generating clock pulses in synchronism with the digits of each pulse word, the combination comprising a plurality of channel input terminals each one for connection to a different one of said channels of said source, a plurality of trigger circuits each having an input terminal and normally primed and normally unprimed output terminals correspondingly connected to said channel input terminals for generating pulses at said normally unprimed output terminals and terminating pulses at said normally primed output terminals in response to pulses at said trigger input terminals, a switching matrix connected to the output terminals of said plurality of trigger circuits and having $\pm x$, $\pm y$, $-x$, $-y$ output terminals together with a stepping output terminal and binary output terminals, said matrix comprising a plurality of "And" and "Or" gate circuits interconnected to selectively produce pulses at said $\pm x$, $\pm y$, $-x$, $-y$ output terminals in accordance with the $x$ and $y$ algebraic sign digits of the input pulse word and a pulse at said stepping output terminal simultaneously with straight binary coded pulse groups at said binary output terminals in corresponding response to each one of the decimal digits of an excess-3 coded input word, first, second, third, and fourth trigger pairs each having first and second input and corresponding first and second output terminals, first, second, and third "Or" gate circuits respectively connected in energizing relationship to said second input terminals of said first, second, and third trigger pairs, triggering means coupling said matrix $\pm x$ terminal to said "Or" gate circuits and to said second input terminal of said fourth trigger pair, triggering means coupling said matrix $\pm y$ terminal to said "Or" gate circuits and to said first input terminal of said fourth trigger pair, a first "And" gate circuit receptively connected to said second output terminals of said first, second, and third trigger pairs, a second "And" gate circuit receptively connected to said first output terminal of said first trigger pair and said second output terminals of said second and third trigger pairs, a third "And" gate circuit receptively connected to said first output terminals of said first and second trigger pairs and to said second output terminal of said third trigger pair, a fourth "And" gate circuit receptively connected to said second output terminals of said first and third trigger pairs and to said first output terminal of said second trigger pair, a fifth "And" gate circuit receptively connected to said second output terminal of said first trigger pair and to said first output terminals of said second and third trigger pairs, a sixth "And" gate circuit receptively connected to said second output terminals of said second trigger pair and to said first output terminal of said third trigger pair, reset gating means respectively coupling said first, second, third, fourth, and fifth "And" gate circuits to said first input terminal of said first trigger pair, said first input terminal of said second trigger pair, said first "Or" gate circuit, said first terminal of said third trigger pair, and said second "Or" gate circuit, pulse generating means coupled in gating relationship between said switching matrix stepping terminal and said reset gating means responsive to the trailing edges of pulses at said stepping terminal, thousands, hundreds, tens, units $x$ decimal digit indicator terminals, an $x$ output gate circuit respectively coupling said first, second, third, fourth "And" gate circuits to said thousands, hundreds, tens, units $x$ decimal digit indicator terminals, means coupling said second output terminal of said fourth trigger pair in gating relationship to said $x$ output gate circuit, thousands, hundreds, tens, units $y$ decimal digit indicator terminals, a pulse word termination indicator terminal, a $y$ output gate circuit respectively coupling said first, second, third, fourth, and fifth "And" gate circuits to said thousands, hundreds, tens, units $y$ decimal digit indicator terminals and said pulse word termination indicator terminal, means coupling said first output terminal of said fourth trigger pair in gating relationship to said $y$ output gate circuit, and means commonly coupling said source clock pulse generating means in gating relationship to said matrix and said $x$ and $y$ output gate circuits for effecting precisely simultaneous occurrences of said binary coded pulse groups and pulses at said indicator terminals.

18. The device described in claim 17 wherein said trigger circuits are Schmitt trigger circuits.

19. The device described in claim 17 wherein said stepping pulse generating means compurises a trailing edge differentiating circuit connected to said matrix stepping terminal, and a relaxation oscillator connected between said differentiating circuit and said reset gating means in gating relation ship thereto.

20. The device described in claim 19 wherein said trigger circuits are Schmitt trigger circuits.

21. In a system for directly expressing excess-3 coded pulse words characterized generally by an $x$ algebraic sign digit followed serially by a plurality of decimal digits in order of decreasing significance preceding a $y$ algebraic sign digit followed serially by a plurality of decimal digits in order of decreasing significance of the type derived from a digital computer as a graphical plot at an electromechanical plotter requiring a straight binary coded input, said computer having a tape printer including a driving motor and producing a digit multi-channel simultaneous pulse output serially indicative of each digit of an excess-3 coded pulse word and a clock channel generating pulses in synchronism with said digits, said plotter having an $x$-storage unit comprising a plurality of $x$ digit storage thyratrons connected at their control grids in four columns corresponding to bits of 8, 4, 2, 1 and in a plurality of rows corresponding to a plurality of decimal digits, and a minus sign storage thyratron, a $y$-storage unit comprising a plurality of $y$-digit storage thyratrons connected at their control grids in four columns corresponding to bits of 8, 4, 2, 1 and in a plurality of rows corresponding to a plurality of decimal digits, and a minus sign storage thyratron, and a control unit for positioning a plotting head with respect to a sheet of graph paper according to information stored in said $x$ and $y$ storage units and plotting a point so determined, the combination comprising input means receptive to said digit multi-channel pulse output from said computer tape printer, a switching matrix coupled to said input means and having $\pm x$, $\pm y$, $-x$, $-y$ output terminals in addition to a stepping output terminal and straight binary 8, 4, 2, 1 output terminals, said matrix comprising a plurality of "And" and "Or" gate circuits interconnected to selectively produce pulses at said $\pm x$, $\pm y$, $-x$, $-y$ output terminals in accordance with the $x$ and $y$ algebraic sign digits of an input pulse word and a pulse at said stepping output terminal simultaneously with pulse groups at said straight binary 8, 4, 2, 1 output terminals in responsive correspondence to each decimal digit of said excess-3 coded pulse word, a synchronous counter having a plurality of $x$ decimal digit indicator terminals, a plurality of $y$ decimal digit indicator terminals, and a plot indicator terminal, driving means coupled between said matrix $\pm x$ and $\pm y$ terminals and said counter for establishing input energizing conditions in said counter to selectively produce pulses at the most significant $x$ and $y$ decimal digit indicator terminals thereof in response to pulses at said $\pm x$ and $\pm y$ terminals respectively, means coupled between said matrix stepping terminal and said counter for stepping said counter off of said most significant $x$ and $y$ decimal digit indicator terminals to produce pulses at successive remaining ones thereof in order of decreasing significance and a pulse at said plot indicator terminal subsequent to a pulse at the least significant one of said $y$ decimal digit indicator terminals in response to the trailing edges at pulses at said matrix stepping terminal, an output gate circuit coupling said matrix 8, 4, 2, 1 binary terminals and $-x$, $-y$ terminals to corresponding thyratron columns and minus sign storage thyratrons of said plotter $x$ and $y$ storage units and coupling said counter $x$ decimal digit and $y$ decimal digit indicator terminals to corresponding thyratron rows of said plotter $x$ and $y$ storage units, gating means coupling said tape printer clock channel in gating relationship to said output gate circuit for effecting synchronous loading of said storage unit columns and rows of thyratrons, and means responsive to pulses at said counter plot indicator terminal commonly coupled to said plotter control unit and said computer tape printer driving motor for actuating said plotter head according to information stored in said storage units while instantaneously de-energizing said driving motor to interrupt said tape printer pulse output until said storage information is plotted.

22. In a system for directly expressing excess-3 coded pulse words characterized generally by an $x$ algebraic sign digit followed serially by thousands, hundreds, tens, units decimal digits and a symbol advance digit preceding a $y$ algebraic sign digit followed serially by thousands, hundreds, tens, units decimal digits of the type derived from a digital computer as a graphical plot at an electromechanical plotter requiring a straight binary coded input, said computer having a tape printer including a driving motor and producing a simultaneous pulse output serially indicative of each digit of an excess-3 coded pulse word at a plurality of digit channels and pulses in synchronism with said digits at a clock channel, said plotter including an $x$ storage unit comprising sixteen $x$ digit storage thyratrons connected at their control grids to form four columns corresponding to straight bits of 8, 4, 2, 1 respectively and four rows corresponding to thousands, hundreds, tens, units decimal digits respectively, and a minus sign storage thyratron, a $y$ storage unit comprising sixteen $y$ digit storage thyratrons connected at their control grids to form four columns corresponding to straight bits of 8, 4, 2, 1 respectively and four rows corresponding to thousands, hundreds, tens, units, decimal digits respectively, and a minus sign storage thyratron, a plotting head including a multi-symbol imprinter and positioned with respect to axes of a sheet of graph paper according to information stored in said $x$ and $y$ storage units, and a control unit including relay means for advancing said symbol imprinter, and means for actuating said plotting head to print points on said graph paper and subsequently clearing said $x$ and $y$ storage units of stored pulse information, the combination comprising a plurality of digit channel input terminals each connected to a different one of said plurality of tape printer digit channels, a clock channel input terminal connected to said tape printer clock channel, a plurality of trigger circuits each having an input terminal and normally primed and normally unprimed output terminals, said trigger circuit input terminals correspondingly connected to said digit channel input terminals for generating pulses at said normally unprimed output terminals and terminating pulses at said normally primed output terminals in response to pulses at said input terminals, a switching matrix having a plurality of "And" and "Or" gate circuits connected to said trigger circuit output terminals and having $\pm x$, $\pm y$, $-x$, $-y$ output terminals in addition to a symbol advance output terminal and a stepping output terminal together with straight binary 8, 4, 2, 1 output terminals, said matrix interconnected in a pre-arranged manner to selectively produce pulses at said $\pm x$, $\pm y$, $-x$, $-y$ output terminals in accordance with the $x$ and $y$ algebraic sign digits as well as a pulse at said symbol advance output terminal in response to a symbol advance digit and a pulse at said stepping output terminal simultaneously with pulse groups at said straight binary 8, 4, 2, 1 output terminals in responsive correspondence to each decimal digit of an excess-3 coded input pulse word, a jam $x$ relaxation oscillator responsive to pulses at said switching matrix $\pm x$ terminal, a jam $y$ relaxation oscillator responsive to pulses at said switching matrix $\pm y$ terminal, four bistable trigger pairs each having two input terminals and two corresponding output terminals, an input matrix connected between said jam $x$ and jam $y$ oscillators and said trigger pair input terminals, said input matrix including a plurality of "And" and "Or" gate circuits interconnected to energize input terminals of the first three of said trigger pairs according to a pre-arranged series of input terminal combinations and the first and second input terminals of the fourth of said trigger pairs in response to pulses at said jam $x$ and jam $y$ oscillators respectively, thousands, hundreds, tens, units $x$ decimal digit indicator terminals, a plot indicator terminal, an output matrix including a plurality of "And" gate circuits connected between the output terminals of said trigger pairs and said $x$ decimal digit, said $y$ decimal digit, and said slot indicator terminals to produce signals at the thousands, hundreds, tens, units, $x$ decimal digit indicator terminals in response to a signal at said first output terminal of said fourth trigger pair in combination with signals at the output terminals of said first three trigger pairs corresponding to said pre-arranged series of input terminal combinations and signals at the thousands, hundreds, tens, units $y$ decimal digit indicator terminals and plot indicator terminal in response to a signal at said second output terminal of said fourth trigger pair in combination with signals at the output terminals of said first three trigger pairs corresponding to said pre-arranged series of input terminals combinations, a trailing edge differentiating circuit connected to said switching matrix stepping terminal to produce trigger pulses corresponding to the trailing edges of pulses at said stepping terminal, a stepping relaxation oscillator generating gate pulses in response to said trigger pulses, reset gating means including said gate circuits of said input and output matrices connected to said stepping oscillator for sequentially energizing said input terminals of said first three trigger pairs according to the next successive one in said series of input terminal combinations in response to coincidences of said gate pulses and signals at said output terminals corresponding to the previous one in said series of terminal combinations, an output gate circuit coupling said stepping matrix 8, 4, 2, 1 binary terminals and $-x$, $-y$ terminals to said 8, 4, 2, 1 columns of thyratrons and minus sign thyratrons of said plotter $x$ and $y$ storage units respectively and coupling said output matrix $x$ decimal digit and $y$ decimal digit indicator terminals to corresponding thyratron rows of said plotter $x$ and $y$ storage units, a clock relaxation oscillator coupled in gating relationship between said clock channel input terminal and said output gate circuit for effecting synchronous loading of said columns and rows of digit thyratrons and minus sign thyratrons of said $x$ and $y$ storage units, means responsive to pulses at said stepping matrix symbol advance terminal connected to said plotter control unit relay means for advancing said symbol imprinter, means responsive to pulses at said output matrix plot indicator terminal commonly coupled to said plotter control unit actuating means and said computer tape printer driving motor for initiating actuation of said plotting head according to information stored in said storage units while de-energizing said tape printer driving motor, and pulse generating means including said control unit actuating means for producing pulses subsequent to actuation periods of said plotting head connected to said stepping oscillator whereby said reset gating means is gated upon termination of said plotting head actuation periods to terminate signals at said output matrix plot indicator terminal and thereby re-energize said tape printer driving motor.

References Cited in the file of this patent

UNITED STATES PATENTS

| | | |
|---|---|---|
| 2,686,299 | Eckert | Aug. 10, 1954 |
| 2,754,450 | Bland | July 10, 1956 |
| 2,770,415 | Lindesmith | Nov. 13, 1956 |